United States Patent [19]

Sturgis et al.

[11] Patent Number: 4,751,669
[45] Date of Patent: Jun. 14, 1988

[54] VIDEOTEX FRAME PROCESSING

[75] Inventors: Samuel P. Sturgis, Medway; William T. Haggerty, Groton; Barbara C. Sangster, Wellesley Hills, all of Mass.

[73] Assignee: Wang Laboratories, Inc., Lowell, Mass.

[21] Appl. No.: 719,777

[22] Filed: Apr. 4, 1985

Related U.S. Application Data

[63] Continuation-in-part of Ser. No. 595,211, Mar. 30, 1984.

[51] Int. Cl.⁴ .............................................. G06F 1/00
[52] U.S. Cl. ...................................................... 364/900
[58] Field of Search ... 364/200 MS File, 900 MS File

[56] References Cited

U.S. PATENT DOCUMENTS

| 4,028,733 | 6/1977 | Ulicki | 364/900 X |
| 4,290,062 | 9/1981 | Marti et al. | 340/735 |
| 4,454,593 | 6/1984 | Fleming et al. | 364/900 |
| 4,587,520 | 5/1986 | Astle | 340/712 |

OTHER PUBLICATIONS

Williams; The Lisa Computer System, Byte; Feb. 1983, pp. 33-44, 46, 48 and 50.

Primary Examiner—Raulfe B. Zache
Attorney, Agent, or Firm—Michael H. Shanahan; Scott K. Peterson

[57] ABSTRACT

A videotex decoder apparatus which, in various aspects, displays a status line to indicate when connect charges are occurring; overlays menus over displayed videotex frames with portions of the displayed frames remaining visible; provides easily called log-on procedures; retrieves remote information frames by user-specified keywords names; prints information frames in selectable different overall sizes; provides selectable different character sets for display; is table-driven; is structured to include a device independent decoder and device dependent drivers; includes a controller which feeds bytes to the decoder for decoding without regard to the protocol-dependent information content of those bytes; and uses an added frame header on stored frames to indicate the videotex protocol for decoding the frames.

42 Claims, 17 Drawing Sheets

FIG. 1

```
┌─────────────────────────────────────┐
│ Select Function - Unconnected Mode  │
│                                     │
│      _ Display local frame          │
│     ╱■ Store frame                  │
│ 43 _ Print frame                    │
│      _ Log-on to remote viewdata    │
│      _ Perform system functions     │
│                                     │
│      EXECUTE   - Proceed            │
│      SPACE BAR - Move Cursor        │
│      CANCEL    - Remove Menu        │
└─────────────────────────────────────┘
                                FIG. 3a
```

```
┌─────────────────────────────────────┐
│       Select a Log-on Proceedure    │
│                                     │
│           _ Prestel                 │
│                                     │
│           _ BTX                     │
│                                     │
│           _ NPLPS                   │
│                                     │
│           _ Other                   │
│      EXECUTE   - Proceed            │
│      SPACE BAR - Move Cursor        │
│      CANCEL    - Remove Menu        │
└─────────────────────────────────────┘
                                FIG. 3b
```

```
┌─────────────────────────────────────┐
│         Log-on to Viewdata          │
│   Please manually dial Viewdata -   │
│ Telephone Numbers:                  │
│   ............      ............    │
│   ............      ............    │
│ ID:              Password:          │
│   ............      ............    │
│       CANCEL - Return to Menu       │
└─────────────────────────────────────┘
                                FIG. 3c
```

```
┌─────────────────────────────────────┐
│  Select Function - Connected Mode   │
│                                     │
│      _ Display local frame          │
│      _ Store frame                  │
│      _ Print frame                  │
│      _ Log-off remote viewdata      │
│      _ Perform system functions     │
│                                     │
│      EXECUTE   - Proceed            │
│      SPACE BAR - Move Cursor        │
│      CANCEL    - Remove Menu        │
└─────────────────────────────────────┘
                                FIG. 3d
```

```
┌─────────────────────────────────────┐
│         Log-off from Viewdata       │
│                                     │
│       Press EXECUTE to log-off      │
│            from Viewdata            │
│                                     │
│                 or                  │
│                                     │
│     CANCEL to return to the menu    │
│                                     │
│      EXECUTE - Log-off              │
│      CANCEL  - Previous Menu        │
└─────────────────────────────────────┘
                                FIG. 3e
```

```
┌─────────────────────────────────────┐
│         Store a Viewdata frame      │
│                                     │
│                                     │
│   Name of Frame: ................   │
│                                     │
│                                     │
│      INDENT   - Frame Directory     │
│      EXECUTE  - Proceed             │
│      CANCEL   - Previous Menu       │
└─────────────────────────────────────┘
                                FIG. 3f
```

```
┌─────────────────────────────────────┐
│      Store Local Frame (Page 1)     │
│   Drive: _   Directory: /........   │
│                                     │
│      filename001     filename008    │
│      filename002     filename009    │
│      filename003     filename010    │
│      filename004     filename011    │
│      filename005     filename012    │
│      filename006     filename013    │
│      filename007     filename014    │
│                                     │
│      NEXT    - Next Directory Page  │
│      CANCEL  - Previous Menu        │
└─────────────────────────────────────┘
                                FIG. 3g
```

```
┌─────────────────────────────────────┐
│         Store a Viewdata Frame      │
│   Frame:                            │
│   ................................  │
│                                     │
│            Already exists           │
│                                     │
│     Press EXECUTE to Overwrite      │
│         the existing frame          │
│                                     │
│                 or                  │
│                                     │
│     CANCEL to return to the Menu    │
└─────────────────────────────────────┘
                                FIG. 3h
```

```
┌─────────────────────────────────────┐
│     Display Local Frame (Page 1)    │
│  Drive: _  Directory: /............ │
│                                     │
│       ...........    filename008    │
│       filename001    filename009    │
│       filename002    filename010    │
│       filename003    filename011    │
│       filename004    filename012    │
│       filename005    filename013    │
│       filename006    filename014    │
│                                     │
│    NEXT   - Next Directory Page     │
│    CANCEL - Previous Menu           │
└─────────────────────────────────────┘
```
FIG. 3i

```
┌─────────────────────────────────────┐
│            Print Frame              │
│                                     │
│         _ Small Format Print        │
│                                     │
│         _ Large Format Print        │
│                                     │
│                                     │
│    EXECUTE   - Proceed              │
│    SPACE BAR - Move Cursor          │
│    CANCEL    - Remove Menu          │
└─────────────────────────────────────┘
```
FIG. 3j

```
┌─────────────────────────────────────┐
│       Select a System Function      │
│                                     │
│    _ Modify Log-on parameters       │
│                                     │
│    _ Modify storage parameters      │
│                                     │
│    _ Delete stored frame            │
│                                     │
│    _ Select character set           │
│                                     │
│       EXECUTE   - Proceed           │
│       SPACE BAR - Move Cursor       │
│       CANCEL    - Remove Menu       │
└─────────────────────────────────────┘
```
FIG. 3k

```
┌─────────────────────────────────────┐
│       Define a Log-on Procedure     │
│                                     │
│   Select a Function:                │
│                                     │
│   _ Modify/Create Procedure         │
│                                     │
│   _ Delete Procedure                │
│                                     │
│       EXECUTE   - Proceed           │
│       SPACE BAR - Move Cursor       │
│       CANCEL    - Previous Menu     │
└─────────────────────────────────────┘
```
FIG. 3l

```
┌─────────────────────────────────────┐
│       Delete a Log-on Procedure     │
│                                     │
│              _ Prestel              │
│              _ BTX                  │
│              _ NPLPS                │
│              _ Other                │
│                                     │
│       EXECUTE   - Proceed           │
│       SPACE BAR - Move Cursor       │
│       CANCEL    - Previous Menu     │
└─────────────────────────────────────┘
```
FIG. 3m

```
┌─────────────────────────────────────┐
│       Delete a Log-on Procedure     │
│                                     │
│   Procedure: ...................   │
│                                     │
│       Press EXECUTE to Delete       │
│            the Procedure            │
│                                     │
│                 or                  │
│                                     │
│     CANCEL to return to the Menu    │
└─────────────────────────────────────┘
```
FIG. 3n

```
┌─────────────────────────────────────┐
│       Define a Log-on Procedure     │
│                                     │
│              _ Prestel              │
│              _ BTX                  │
│              _ NPLPS                │
│              _ Other                │
│              _ ..........           │
│                                     │
│       EXECUTE   - Proceed           │
│       SPACE BAR - Move Cursor       │
│       CANCEL    - Previous Menu     │
└─────────────────────────────────────┘
```
FIG. 3o

```
┌─────────────────────────────────────┐
│       Define a Log-on Procedure     │
│                                     │
│   Serial Communications Port:       │
│       _ Port 1      _ Port 4        │
│       _ Port 2                      │
│       _ Port 3                      │
│                                     │
│   Transmit/Receive Rate:            │
│       _ Equal Speed  _ Split Speed  │
│                                     │
│       EXECUTE   - Proceed           │
│       SPACE BAR - Move Cursor       │
│       CANCEL    - Previous Menu     │
└─────────────────────────────────────┘
```
FIG. 3p

```
┌─────────────────────────────────────┐
│      Define a Log-on Procedure      │
│  Receive Data Rate:                 │
│   _ 50     _ 150    _ 1800  _ 4800  │
│   _ 75     _ 300    _ 2000  _ 7200  │
│   _ 110    _ 600    _ 2400  _ 9600  │
│   _ 134.5  _ 1200   _ 3600  _ 19200 │
│       EXECUTE    - Proceed          │
│       SPACE BAR - Move Cursor       │
│       CANCEL     - Previous Menu    │
└─────────────────────────────────────┘
```
FIG. 3q

```
┌─────────────────────────────────────┐
│      Define a Log-on Procedure      │
│  Transmit Data Rate:                │
│   _ 50     _ 150    _ 1800  _ 4800  │
│   _ 75     _ 300    _ 2000  _ 7200  │
│   _ 110    _ 600    _ 2400  _ 9600  │
│   _ 134.5  _ 1200   _ 3600  _ 19200 │
│       EXECUTE    - Proceed          │
│       SPACE BAR - Move Cursor       │
│       CANCEL     - Previous Menu    │
└─────────────────────────────────────┘
```
FIG. 3r

```
┌─────────────────────────────────────┐
│      Define a Log-on Procedure      │
│  Transmit/Receive Data Rate:        │
│   _ 50     _ 150    _ 1800  _ 4800  │
│   _ 75     _ 300    _ 2000  _ 7200  │
│   _ 110    _ 600    _ 2400  _ 9600  │
│   _ 134.5  _ 1200   _ 3600  _ 19200 │
│       EXECUTE    - Proceed          │
│       SPACE BAR - Move Cursor       │
│       CANCEL     - Previous Menu    │
└─────────────────────────────────────┘
```
FIG. 3s

```
┌─────────────────────────────────────┐
│      Define a Log-on Procedure      │
│  Number of data bits:               │
│       _ 5   _ 6   _ 7   _ 8         │
│  Stop bit length:                   │
│       _ 1   _ 1.5   _ 2             │
│  Parity:                            │
│     _ None _ Even _ Odd _ Ignore    │
│       RETURN     - Next Field       │
│       EXECUTE    - Proceed          │
│       SPACE BAR - Move Cursor       │
│       CANCEL     - Previous Menu    │
└─────────────────────────────────────┘
```
FIG. 3t

```
┌─────────────────────────────────────┐
│      Define a Log-on Procedure      │
│  Error Substitute Action:           │
│     _ Enable  _ Pass  _ Delete      │
│  Error Substitute Character Code:   │
│     127                             │
│  Duplex:                            │
│     _ Full    _ Half                │
│       RETURN     - Next Field       │
│       EXECUTE    - Proceed          │
│       SPACE BAR - Move Cursor       │
│       CANCEL     - Previous Menu    │
└─────────────────────────────────────┘
```
FIG. 3u

```
┌─────────────────────────────────────┐
│      Define a Log-on Procedure      │
│  Character Set:                     │
│           _ English                 │
│           _ German                  │
│       EXECUTE    - Proceed          │
│       SPACE BAR - Move Cursor       │
│       CANCEL     - Previous Menu    │
└─────────────────────────────────────┘
```
FIG. 3v

```
┌─────────────────────────────────────┐
│      Define a Log-on Procedure      │
│  Identification number:             │
│     _____             │
│  Password (Optional):               │
│     _____             │
│       RETURN     - Next Field       │
│       EXECUTE    - Proceed          │
│       CANCEL     - Previous Menu    │
└─────────────────────────────────────┘
```
FIG. 3w

```
┌─────────────────────────────────────┐
│      Define a Log-on Procedure      │
│       Telephone Numbers:            │
│     _____             │
│     _____             │
│     _____             │
│     _____             │
│     _____             │
│       RETURN     - Next Field       │
│       EXECUTE    - Proceed          │
│       CANCEL     - Previous Menu    │
└─────────────────────────────────────┘
```
FIG. 3x

```
┌─ Define a Log-on Procedure ─┐
│ Logoff Code:                │
│ Backup Frame Code:          │
│ Repeat Frame Code:          │
│ Home Frame Code:            │
│   EXECUTE   - Proceed       │
│   SPACE BAR - Move Cursor   │
│   CANCEL    - Previous Menu │
└─────────────────────────────┘
```
FIG. 3y

```
┌─ Define a Log-on Procedure ─┐
│   Define User Keywords 1-8  │
│ Name:          Code:        │
│ ............   ...........  │
│ ............   ...........  │
│ ............   ...........  │
│ ............   ...........  │
│ ............   ...........  │
│ ............   ...........  │
│ ............   ...........  │
│ ............   ...........  │
│   EXECUTE - Proceed         │
│   CANCEL  - Previous Menu   │
└─────────────────────────────┘
```
FIG. 3z

```
┌─ Define a Log-on Procedure ─┐
│ _ Display on Log-on Menu    │
│ _ Do Not Display on Log-on Menu │
│   EXECUTE   - Proceed       │
│   SPACE BAR - Move Cursor   │
│   CANCEL    - Previous Menu │
└─────────────────────────────┘
```
FIG. 3aa

```
┌─ Define a Log-on Procedure ─┐
│   Procedure: ............   │
│                             │
│   Press EXECUTE to Store    │
│        the procedure        │
│              or             │
│   Cancel to return to the Menu │
└─────────────────────────────┘
```
FIG. 3bb

```
┌─ Modify Storage Parameters ─┐
│   Drive: _                  │
│   Directory: / ..........   │
│   EXECUTE - Proceed         │
│   CANCEL  - Previous Menu   │
└─────────────────────────────┘
```
FIG. 3cc

```
┌─ Delete Local Frame (Page 1) ─┐
│ Drive: _   Directory: / ....  │
│                  filename008  │
│   filename001    filename009  │
│   filename002    filename0010 │
│   filename003    filename0011 │
│   filename004    filename0012 │
│   filename005    filename0013 │
│   filename006    filename0014 │
│   NEXT    - Next Directory Page │
│   CANCEL  - Previous Menu     │
└───────────────────────────────┘
```
FIG. 3dd

```
┌─────────────────────────────┐
│  Save Frame was Successful  │
│  Delete Frame was Successful│
│ Change Directory was Successful │
│  Modify Log-on was Successful │
│  Delete Log-on was Successful │
│ Change Char. Set was Successful │
└─────────────────────────────┘
```
FIG. 3ee

```
┌─────────────────────────────┐
│   The disk is write-protected │
│   The file could not be found │
│   The disk drive is not ready │
│        The disk is full       │
│   A disk write error occurred │
│   A disk read error occurred  │
│  An unknown disk error occurred │
│   The disk directory is full  │
│   The disk directory is missing │
│    A Printer Failure Occurred │
│   Serial I/O hardware is missing │
│   Not enough memory is available │
│                               │
│  Display Frame was unsuccessful - │
│   Store Frame was unsuccessful -  │
│    'Config.vsp' file read failed - │
│   Delete Frame was unsuccessful - │
│     Modify was unsuccessful -     │
│  Read Directory was unsuccessful - │
│                               │
│   Print Frame was unsuccessful - │
│      Log-on was unsuccessful -   │
└─────────────────────────────┘
```
FIG. 3ff

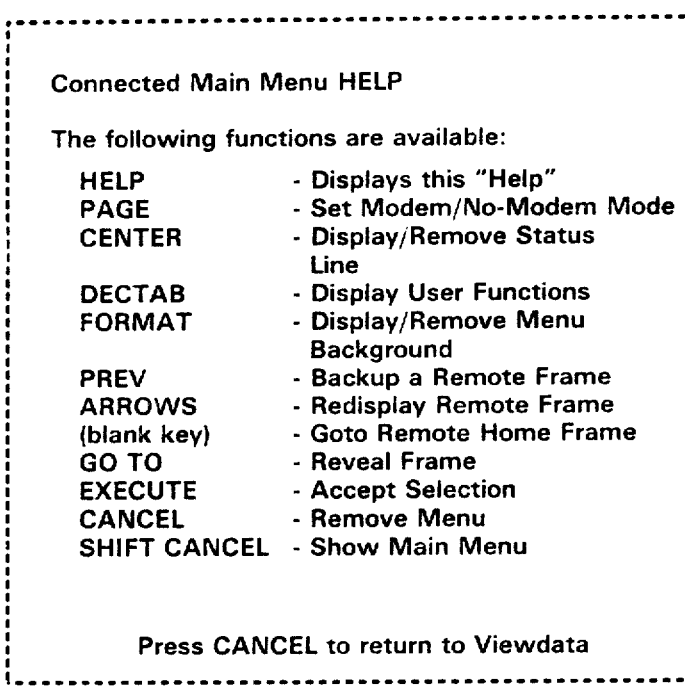

```
Connected Main Menu HELP

The following functions are available:
    HELP            - Displays this "Help"
    PAGE            - Set Modem/No-Modem Mode
    CENTER          - Display/Remove Status
                      Line
    DECTAB          - Display User Functions
    FORMAT          - Display/Remove Menu
                      Background
    PREV            - Backup a Remote Frame
    ARROWS          - Redisplay Remote Frame
    (blank key)     - Goto Remote Home Frame
    GO TO           - Reveal Frame
    EXECUTE         - Accept Selection
    CANCEL          - Remove Menu
    SHIFT CANCEL    - Show Main Menu Press CANCEL to return to Viewdata
```

FIG. 4

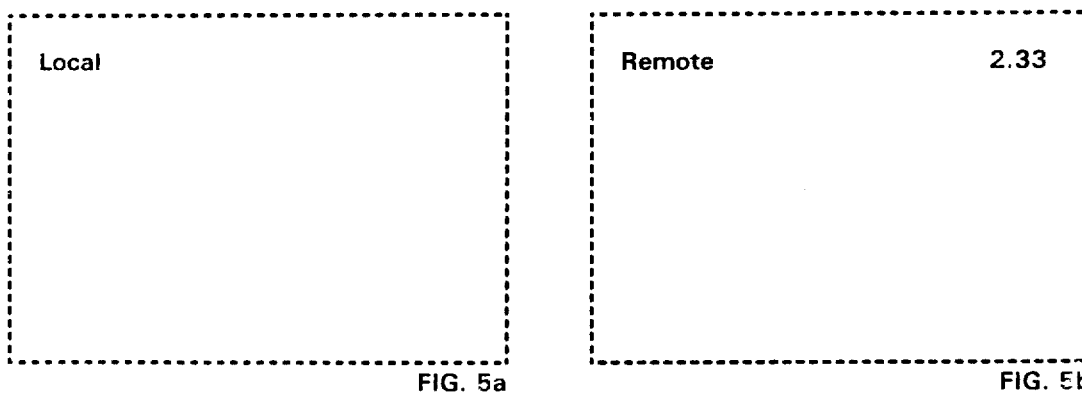

| CHARACTER | TRANSITION TABLE ROW NUMBER |
|---|---|
| @ | 13 |
| A | 19 |
| B | 19 |
| C | 19 |
| D | 19 |
| . | . |
| . | . |
| . | . |

FIG. 9

| ROW NUMBER | STATES | | | |
|---|---|---|---|---|
| | 0 DISPLAY | 1 ESCAPE | 2 ESCAPE 1 | . . . |
| . . . | | | | |
| 13 | DISPLAY CHARACTER, 0 | DISPLAY SPACE, 0 | DISPLAY SPACE, 0 | . . . |
| . . . | | | | |
| 19 | DISPLAY CHARACTER, 0 | ALPHA FONT AND COLOR ATTRIBUTE, 0 | DISPLAY SPACE, 0 | . . . |

FIG. 10

VIDEOTEX FRAME PROCESSING

This application is a continuation in part of U.S. patent application, Ser. No. 595,211, filed Mar. 30, 1984, titled Enhanced Videotex Decoder Apparatus.

BACKGROUND OF THE INVENTION

This invention relates to videotex systems.

In typical videotex systems, textual and qraphic information from a variety of sources (such as newspapers, retailers, or banks) is made available by a videotex supplier to a large number of subscribers via interactive two-way communication over the switched telephone network.

The videotex supplier electronically stores the information supplied by the different sources in the form of hundreds of thousands of pages (frames) each representing a collection (arranged, for example, in rows and columns) of alphanumeric and graphic characters to be displayed on a cathode ray tube (CRT) at the subscriber's location. Each frame is sent to the subscriber as a stream of encoded bytes. Some of the bytes identify the particular characters to be displayed. Other bytes are essentially instructions about the attributes of the displayed frame, for example, the size of a particular character or the background color for a particular line of characters. The characters and attribute information are translated into the encoded bytes in accordance with a set of rules (protocol) applied by each supplier.

In addition to a CRT, each subscriber has a decoder for converting the received encoded bytes back to the displayable alphanumeric or graphic characters and attribute instructions, and a keyboard with which the subscriber can tell the videotex supplier what frames to send to the subscriber, and can respond to questions posed in particular frames.

Different videotex protocols have been developed in different countries, for example Prestel in the United Kingdom, Telidon in Canada, and NAPLPS in the United States. A description of the Prestel system is set forth in Hudson, "Prestel: The Basis of an Evolving Videotex System", (BYTE, July, 1983, p. 61), and in "Prestel Terminal Specification" updated through 8/1/83, available from Prestel Headquarters, Prestel 435, Telephone House, Temple Avenue, London EC4Y OHL, England, both incorporated herein by reference.

Some videotex decoders allow the subscriber to switch between viewing frames being supplied over the telephone line and frames which have been stored locally. Frames explaining to the subscriber how to proceed may also be displayed.

SUMMARY OF THE INVENTION

In general, the invention features, in one aspect, apparatus for locally displaying frames of digital information received from a central supplier, including a port connectable to the central supplier for receiving at least one of the information frames from the central supplier, a display device for locally displaying at least one of the information frames received from the central supplier, a storage device for locally storing, after it has been displayed, as a stored frame for later redisplay, at least one of the information frames received from the central supplier, and a processor connected to be responsive to the port and the storage device and comprising means for displaying, while the port is connected to the central supplier, an indication that the port is connected.

In preferred embodiments, the means for displaying is further arranged to display an indication of the expense entailed in the connection, in particular, the time which has elapsed during the period since the port was most recently connected; the indication of expense is displayed on the display device simultaneously while an information frame is being displayed; the processor also includes means for enabling the user to selectively either display or not display the indication that the port is connected; the means for displaying is further arranged to display an indication of whether the information frame being displayed is a stored frame from the storage device; the processor further includes means for enabling the user to selectively either display or not display the indication of whether the information frame being displayed is a stored frame from the storage device; the means for displaying is further arranged to display, while the port is unconnected to the central supplier, an indication that the port is unconnected; and the apparatus includes a data entry device for enabling the entry of data into the apparatus, the data including commands representing actions to be taken with respect to the information frames, and the processor includes means for delivering to the display device at least one menu frame for visually indicating possible actions which may be taken with respect to the information frames, including the actions of switching back and forth between displaying the information frames as they are received from the supplier, and displaying stored frames from the storage device, and the processor also includes means responsive to the data entry device for accepting and executing entered commands corresponding to the possible actions.

Displaying the status line (i.e., the indications that the port is connected, and whether or not the displayed frame is from the local storage device) reminds the user of subscriber fees and telephone tolls being incurred while connected to the videotex supplier.

In another aspect, the invention features apparatus for locally displaying frames of digital information received from a videotex supplier, including a port connectable to the central supplier for receiving at least one of the information frames from the supplier, a display device for displaying at least one of the information frames received from the supplier, and a processor comprising means for delivering to the display device at least one menu frame for visually indicating possible actions which may be taken while an information frame received from the supplier is being displayed on the display device, and means for visually overlaying the menu frame over the displayed information frame so that at least a portion of the displayed information frame is displayed simultaneously with the menu frame.

In preferred embodiments, the processor includes a data entry device for enabling the entry of data into the apparatus, including commands to cause the processor to selectively either overlay the menu over the displayed frame, or to display the menu without any underlying display of any portion of the previously displayed information frame; the possible actions include actions to be taken with respect to the underlying information frame; and one action is the storage of the underlying displayed information frame.

The overlay enables the user to observe at least part of the current frame while acting on a particular menu.

In another aspect, the invention features apparatus for obtaining access via a switched communications network to a central supplier of frames of digital information for obtaining frames to be visually displayed locally, comprising means for delivering to the central supplier via the network stored coded information required by the central supplier as a condition to allowing access to the central supplier, a display device for displaying the frames of digital information, a data entry device for enabling the entry of data into the apparatus, including commands, and a processor comprising menu means for sending to the display device a menu frame identifying the central supplier as being accessible, and log-on means responsive to the data entry device for accepting and executing an entered command to obtain access to the supplier, by triggering the means for delivering to send the coded information.

In preferred embodiments, the coded information delivered to the supplier includes a subscriber identifier; means for holding protocol information about a protocol specified by the supplier and governing the information frames of the supplier; each information frame comprises a collection of multiple-bit bytes and the means for holding is arranged to hold protocol information which includes the number of bits in each byte; the means for holding is arranged to hold protocol information which includes a table of commands each associated with an instruction specified by the supplier for retrieving information frames from the supplier, each command corresponding to a key on the data entry device, and the processor further includes means responsive to the data entry device for sending to the supplier in response to the pressing of a key, the instruction associated with the command corresponding to the pressed key; the specified instructions include instructions to retrieve the prior information frame, to repeat the presently retrieved information frame, to log off, and to go to the home frame; there are a plurality of central suppliers each requiring its own coded information; the apparatus includes means for specifying and updating, by data entered through the data entry device, the coded information to be delivered to the supplier when access to the supplier is commanded; the processor includes means for specifying and updating the protocol information held in the means for holding; and the menu sent by the menu means identifies at least a plurality of the suppliers, and the log-on means is responsive to the data entry device for accepting and executing an entered command to obtain access to one of the suppliers by triggering the means for delivering to send to that one supplier the coded information required by it.

The user thus can easily, quickly, and accurately log on to the videotex supplier's system.

In another aspect, the invention features apparatus for retrieving selected frames of information from a central videotex supplier of the information frames, each information frame having an associated unique identifier assigned by the supplier for retrieving the frame, the apparatus comprising a display device for displaying the information frames, storage means for storing the identifier and a unique keyword selected by the operator and associated with the identifier, menu means for displaying on the display device a menu frame containing the keyword, data entry means for entering into the apparatus a request for the retrieval of a selected information frame by moving a cursor to the keyword associated with the selected information frame, and a processor responsive to the data entry means for retrieving the information frame in response to the entry of the request by transmitting the associated identifier to the supplier.

In preferred embodiments, the data entry means is further arranged for entering the request by typing in the keyword; and the processor comprises means for enabling specifications and updating of the keywords appearing on the menu frame and the identifier associated with each keyword by commands entered through the data entry device.

The user can easily and quickly retrieve particular frames, e.g., a weather forecast, from the videotex supplier using an easy to remember keyword.

In another aspect, the invention features apparatus for locally storing frames of digital information received from a central videotex supplier, including a port connectable to the central supplier for receiving at least one of the information frames from the central supplier, a display device for locally displaying at least one of the information frames received from the central supplier, a storage device for locally storing, after it has been displayed, as a stored frame for later redisplay, at least one of the information frames received from the central supplier, a data entry device for enabling the entry of data into the apparatus, and a processor comprising means for accepting from the data entry device a name specified by the subscriber to be associated with a particular displayed information frame, means for storing the particular ihformation frame in the storage device together with the associated name, and means for retrieving the particular information frame from the storage device in response to entry through the data entry device of a command corresponding to the name specified for that frame.

In preferred embodiments, the processor also includes means for grouping information frames into directories, and mean for accepting from the data entry device commands designating the directory in which a particular displayed frame is to be stored; there are a plurality of central videotex suppliers and the processor further includes means for accepting from the data entry device commands for storing in a single directory frames received from different suppliers; the processor also includes means for displaying on the display device a menu listing by name the information frames stored in a given directory, and means for accepting from the data entry device a command corresponding to the name of an information frame included in the menu for retrieval from the directory; the command is entered by steps which include moving a cursor to the name of the information frame on the menu; and the command is entered by steps which include typing the name of the information frame on the data entry device.

In another aspect, the invention features apparatus for printing frames of digital information received from a central videotex supplier, comprising a port connectable to the central supplier for receiving at least one of the information frames from the central supplier, a printing device for locally printing at least one of the information frames received from the central supplier, and a processor comprising means for delivering to the printer digital information corresponding to an information frame to be printed, and means for confiquring the digital information to cause the printed information frame to be of a selectable overall size.

In preferred embodiments, there is a data entry device for enabling the entry of data into the apparatus, and the processor further comprises means for accepting from the data entry device commands corresponding to the different selectable overall sizes.

The user can easily choose different overall sizes of the printout.

In another aspect, the invention features apparatus for processing frames of information received from a central videotex supplier, different information frames comprising characters intended to be displayed by means of different character sets, the apparatus comprising a port connectable to the videotex supplier for receiving the information frames, a display device for displaying the received information frames, a storage device for storing character font information corresponding to the different character sets, a data entry device for entering data into the apparatus, and a processor comprising means for accepting from the data entry device commands each corresponding to the display of information frames according to one of the different character sets, and means for executing a command by reference to the stored font information corresponding to the character set specified by that command.

In preferred embodiments, the character sets include an English character set, a German character set, a Scandinavian character set, and a Belgian character set.

Different language fonts thus can be handled automatically.

In another aspect, the invention features apparatus for locally decoding a stream of bytes representing a frame of information received from a videotex supplier, comprising means for receiving each byte in turn for decoding, means for storing a table of entries each indicating what action is to be performed with respect to each byte based on the identity of the byte and on the current state of the decoder, and means for decoding each byte by finding the entry in the table corresponding to the action to be performed and thereafter performing that action.

In preferred embodiments, an index array indicates, for each said byte, the location in the table wherein the action to be performed will be found, given the current decoder state; the current state is a display state and the action to be performed is to display a character corresponding to the byte; the current state is other than a display state and the action to be performed is to implement a visual attribute of the frame as specified by the byte; when the decoder occupies a particular decoder state certain of the bytes cannot, according to a predetermined protocol for encoding the bytes, properly appear in the stream of bytes, and the entries in the table corresponding to certain bytes and to the particular state indicate that the action to be performed is to display a space; and the entries in the table correspond to a Prestel encoding protocol.

The table driven decoder is fast and flexible. Invalid bytes are decoded as spaces on the display.

In another aspect, the invention features apparatus for displaying a frame of information represented by a stream of bytes received from a videotex supplier, the bytes being encoded in accordance with a particular videotex protocol, the apparatus comprising a device for visually displaying the frame based on bit images that are encoded in accordance with a display device protocol different from the videotex protocol, means for decoding the bytes into alphanumeric and mosaic characters that are based on the videotex protocol and are independent of the display device protocol, and device dependent driver means for converting the characters into the bit images in accordance with the display device protocol.

In preferred embodiments, the display device is arranged to display the bit images in accordance with visual attributes that are encoded in the stream of bytes in accordance with the videotex protocol, the visual attributes are conveyed to the display device in accordance with the display device protocol, the means for decoding is arranged to decode the stream of bytes into visual attributes that are based on the videotex protocol and are independent of the display device protocol, and the device dependent driver means is arranged to convert the visual attributes into visual features of the bit images in accordance with the display device protocol; and there are a plurality of the display devices having different display device protocols, and a plurality of the device dependent driver means one for each display device, for converting the characters into the bit images in accordance respectively with the different display device protocols.

By making the decoder "device independent", while the display drivers are "device dependent", the system can easily accommodate different display device protocols.

In another aspect the invention features apparatus for decoding a frame of information represented by a stream of bytes received from a videotex supplier, the bytes being encoded in accordance with a videotex protocol, the apparatus comprising mean for decoding the bytes into alphanumeric and mosaic characters based on the videotex protocol, and means for controlling the decoding by accepting the stream of bytes from the supplier and delivering each byte to the decoding means, the controlling means being arranged to accept and deliver the bytes to the decoding means without regard to the protocol-dependent information content of the bytes.

The controller can therefore be arranged to easily serve different videotex protocols.

In another aspect, the invention features means for updating the current state of the decoder, after each byte is decoded, in accordance with the current state and the identity of the decoded byte.

In another aspect, the invention features apparatus for locally processing frames of information received from central videotex suppliers, different frames being encoded in accordance with different protocols, including means for locally storing the information frames, means for locally displaying the frames, means for decoding the locally stored frames as they are displayed, and means for tagging each stored frame with a header indicating the protocol used for encoding the frame, the means for decoding being arranged to decode each frame in accordance with the protocols indicated by the header of the frame.

Tagging permits proper decoding of various different frames from different suppliers using the proper protocols.

Other advantages and features will become apparent from the following description of the preferred embodiment, and from the claims.

DESCRIPTION OF THE PREFERRED EMBODIMENTS

We first briefly describe the drawings.

Drawings

FIG. 3a is a menu displayed when the system enters the unconnected mode.

FIG. 3b is a log-on menu.

FIG. 3c is a menu which allows a subscriber to log-on to a videotex supplier.

FIG. 3d is a menu similar to the menu of FIG. 3a.

FIG. 3e is a menu which allows a subscriber to log-off a videotex supplier.

FIG. 3f is a menu which allows a subscriber to store a videotex frame

FIG. 3l is a menu which allows a subscriber to modify log-on parameters.

FIG. 3m is a menu which enables a subscriber to select a log-on procedure to be deleted.

FIG. 3n is a menu which requires a subscriber to confirm his wish to delete a log-on procedure.

FIG. 3o is a menu which allows a subscriber to specify or change a short name for a procedure.

FIG. 3p is a menu which allows a subscriber to specify or change the serial communications port at which a modem is connected.

FIG. 3q is a menu which allows a subscriber to change or specify the baud rate for receiving data.

FIG. 3r is a menu which allows a subscriber to change or specify the baud rate for transmitting data.

FIG. 3s is a menu which allows a subscriber to specify that data is to be received and transmitted at equal speeds.

FIG. 3t is a menu which allows a subscriber to change or specify the number of bits per character, the stop bit length, and the parity protocol.

FIG. 3u is a menu which allows a subscriber to change or specify an error substitute action and character code, and a duplex mode.

FIG. 3v is a menu which allows a subscriber to change or specify the character set.

FIG. 3w is a menu which allows a subscriber to change or specify the subscriber identification number and password.

FIG. 3x is a menu which allows a subscriber to change or specify telephone numbers of a videotex supplier.

FIG. 3y is a menu which allows a subscriber to change or specify the proper codes to control the delivery of frames from a videotex supplier.

FIG. 3z is a menu which allows a subscriber to change or specify user keyboard names and codes.

FIG. 3aa is a menu which allows a subscriber to chose to display or not to display a log-on procedure as part of a log-on menu.

FIG. 3bb is a menu which requires a subscriber to confirm storage of a just-defined log-on procedure.

FIG. 3cc is a menu which enables a subscriber to specify a current directory of stored local frames.

FIG. 3dd is a menu which enables a subscriber to name a file to be deleted.

Figure 2:
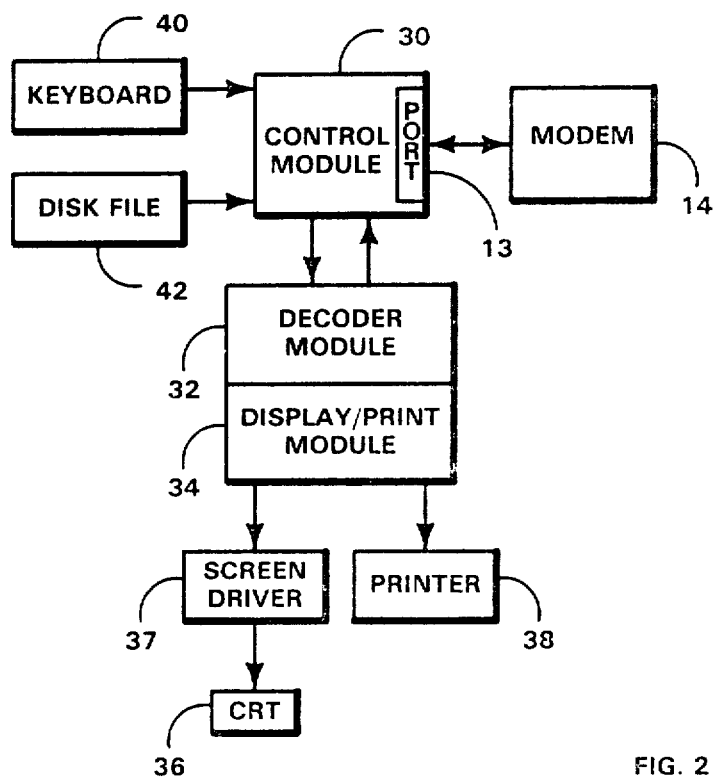
FIG. 2 is a block diagram of the subscriber's equipment of FIG. 1.

FIG. 3ee is a collection of messages for display on the display device of FIG. 2.

FIG. 3ff is a collection of messages for display on the display device of FIG. 2.

Figure 3G:
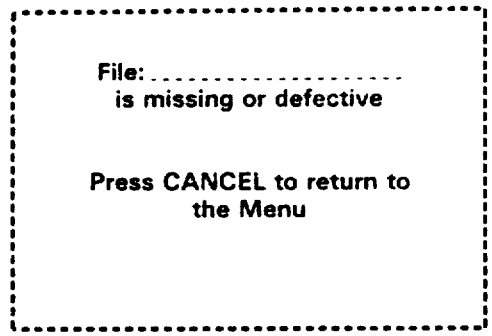
FIG. 3g is a menu which displays the frames stored in the current directory.

FIG. 3gg is a message that a file is missing or defective.

Figure 3I:
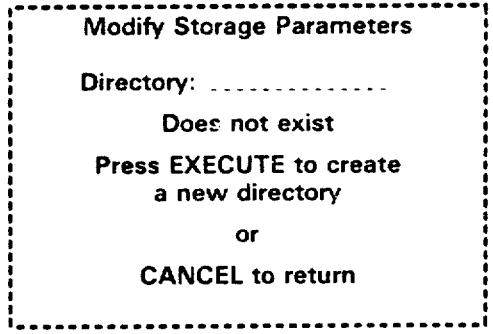
FIG. 3i is a menu which allows a subscriber to chose a frame to be displayed.
Figure 3H:
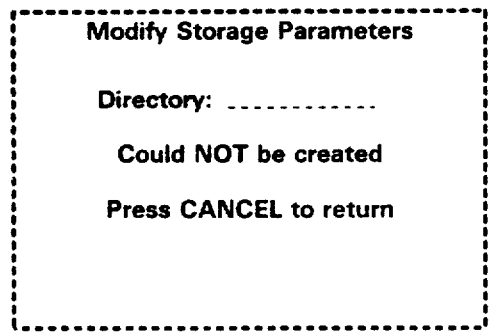
FIG. 3h is a menu which requires a subscriber to confirm that he wishes to replace on old stored frame.

FIG. 3hh is a message that a directory of a given name could not be created.

FIG. 3ii is a message that a given directory does not exist.

Figure 3J:
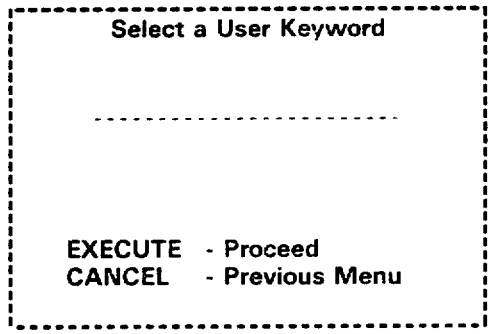
FIG. 3j is a menu which allows a subscriber to select small or large format print.

FIG. 3jj is a menu which allows a subscriber to select one of the available user keywords.

Figure 3K:
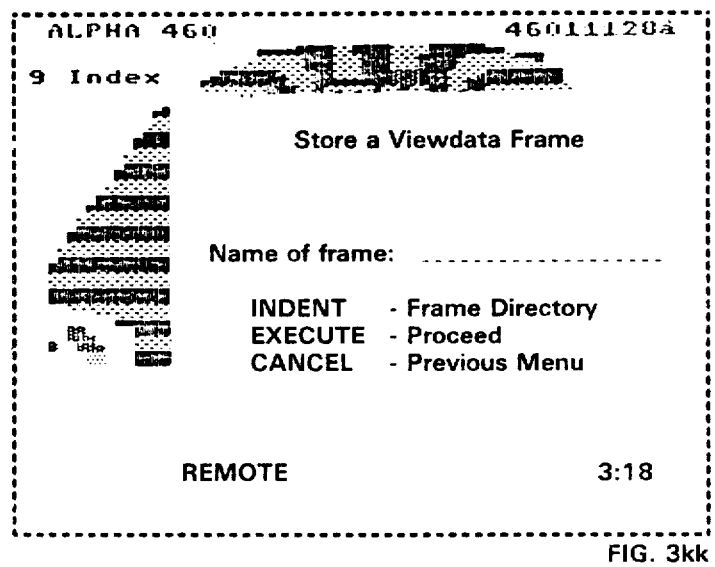
FIG. 3k is a menu which allows a subscriber to chose one of four system functions.

FIG. 3kk is a display of a frame overlaid by a menu.

FIG. 4 is a representative help frame for display on the display device of FIG. 2.

FIG. 5a, 5b are status lines for display on the display device of FIG. 2.

Figure 6:
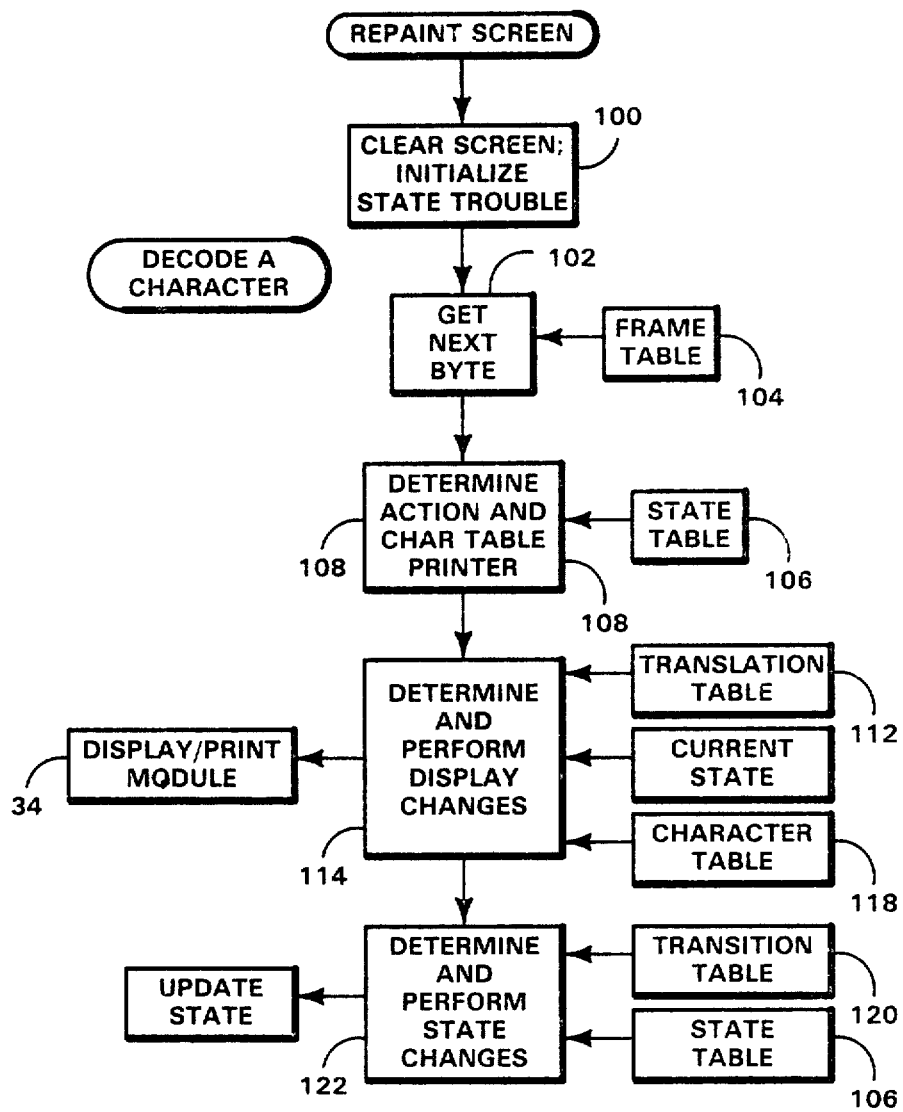

FIG. 6 is a flow diagram of the operation of the decoder module of FIG. 2.

Figure 7A:
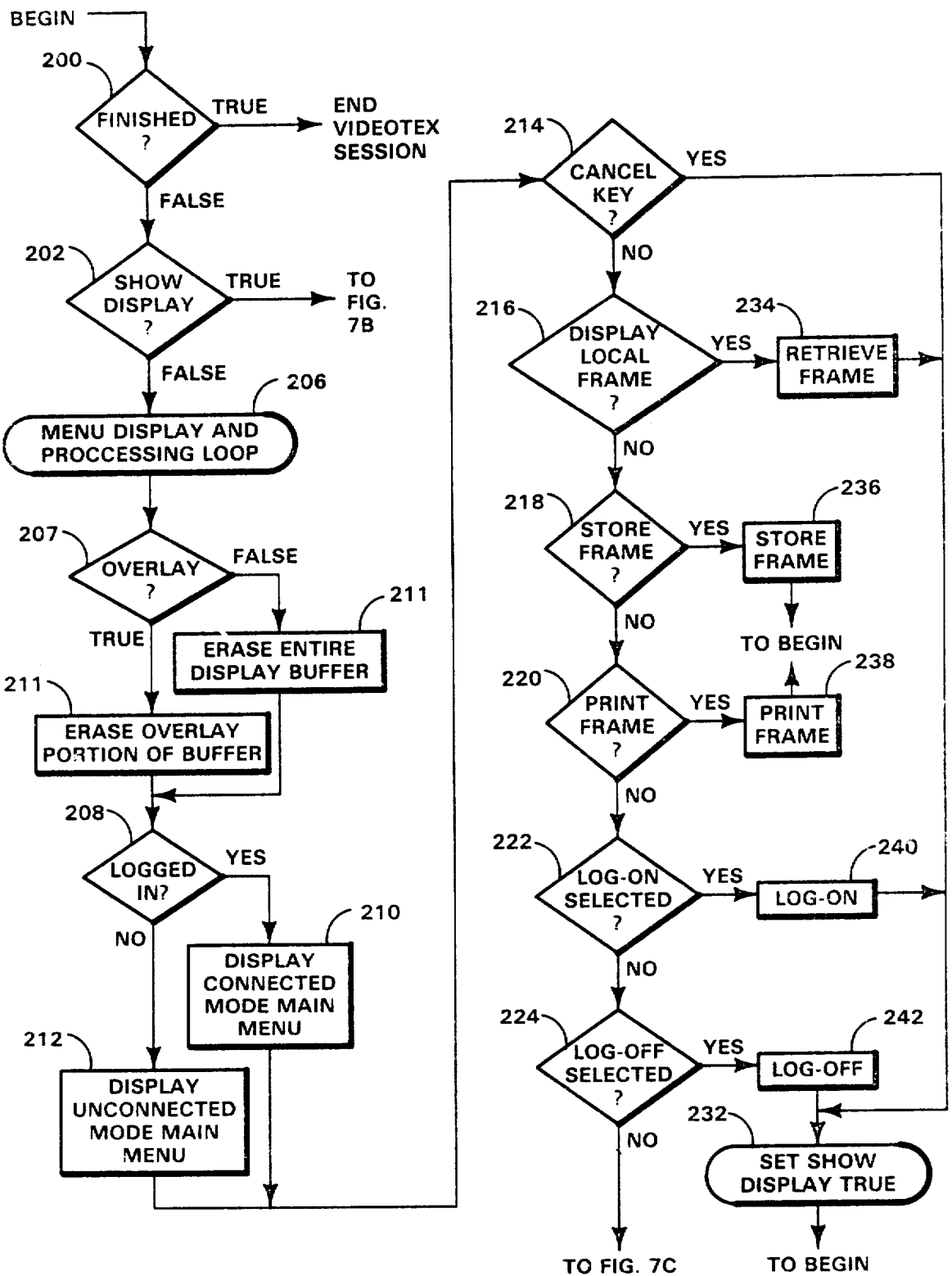
Figure 7B:
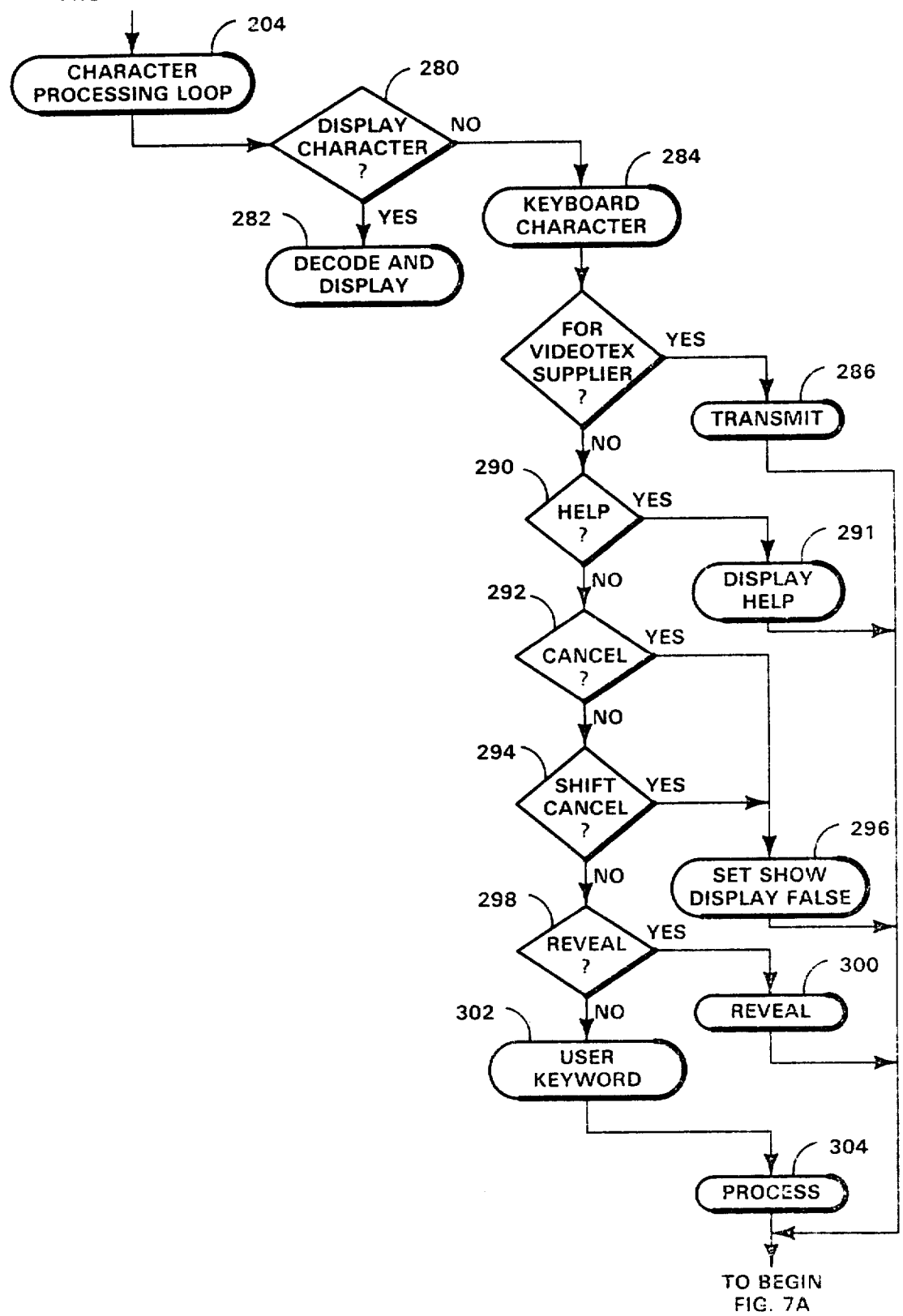
Figure 7C:
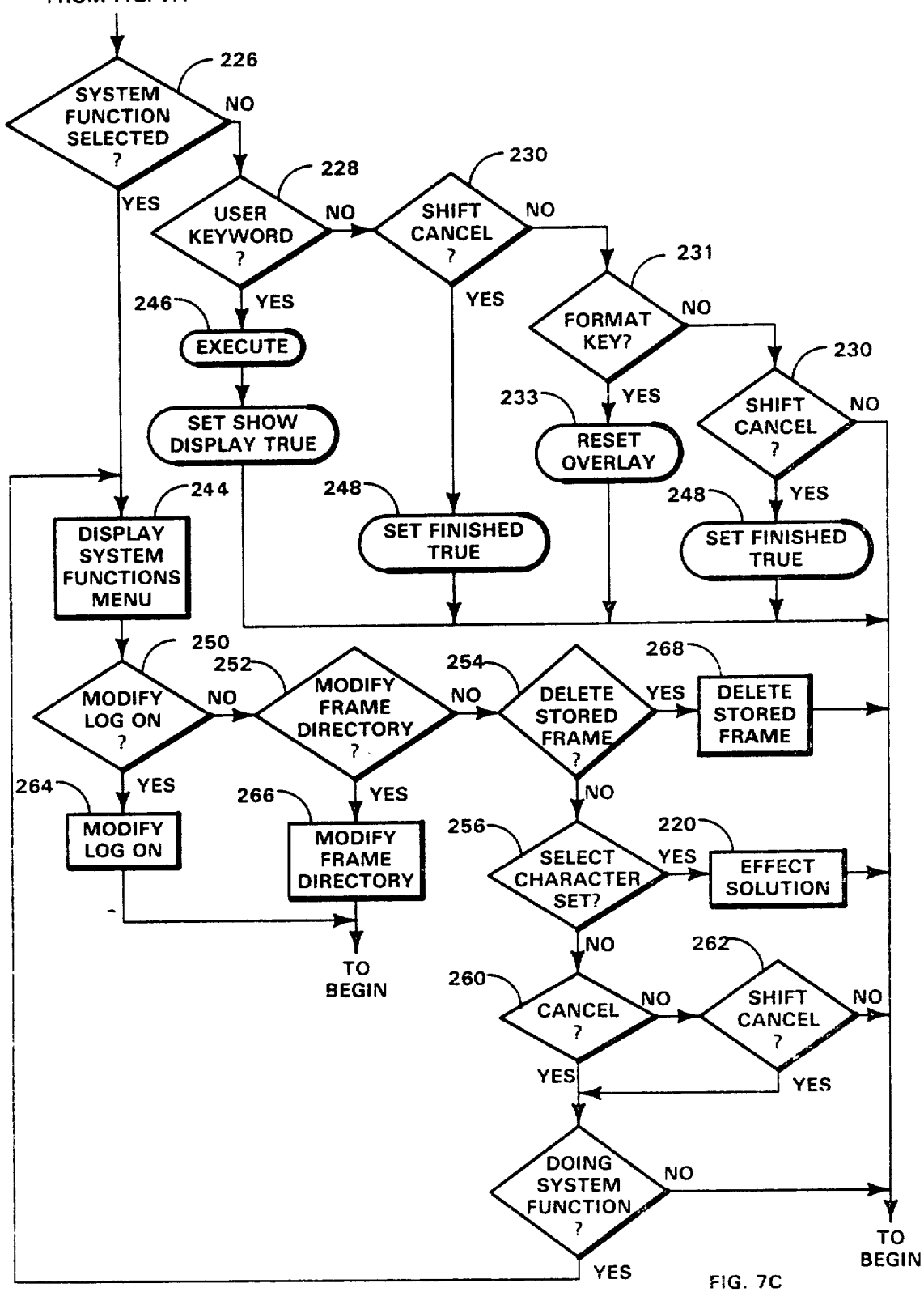
Figure 7D:
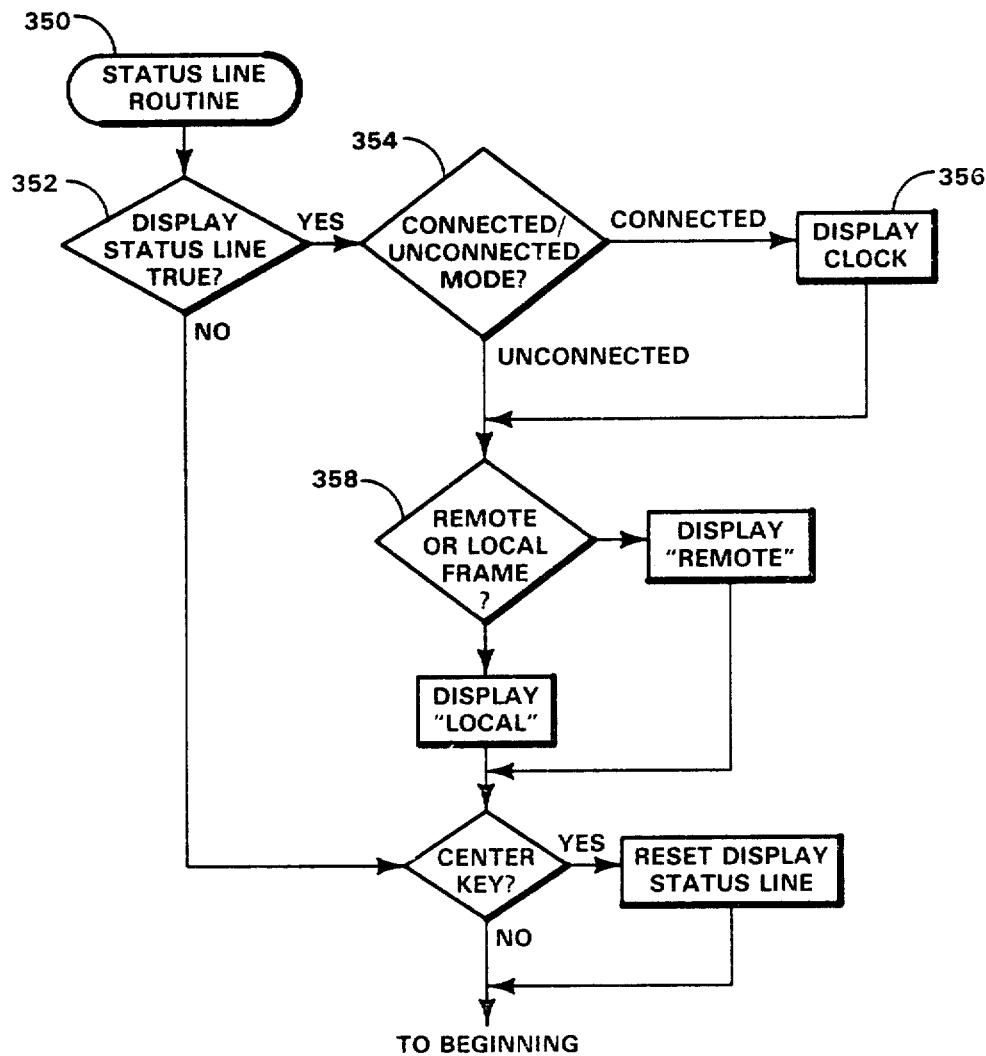

FIGS. 7a, 7b, 7c are flow diagrams of the operation of the control module of FIG. 2.

Figure 8A:
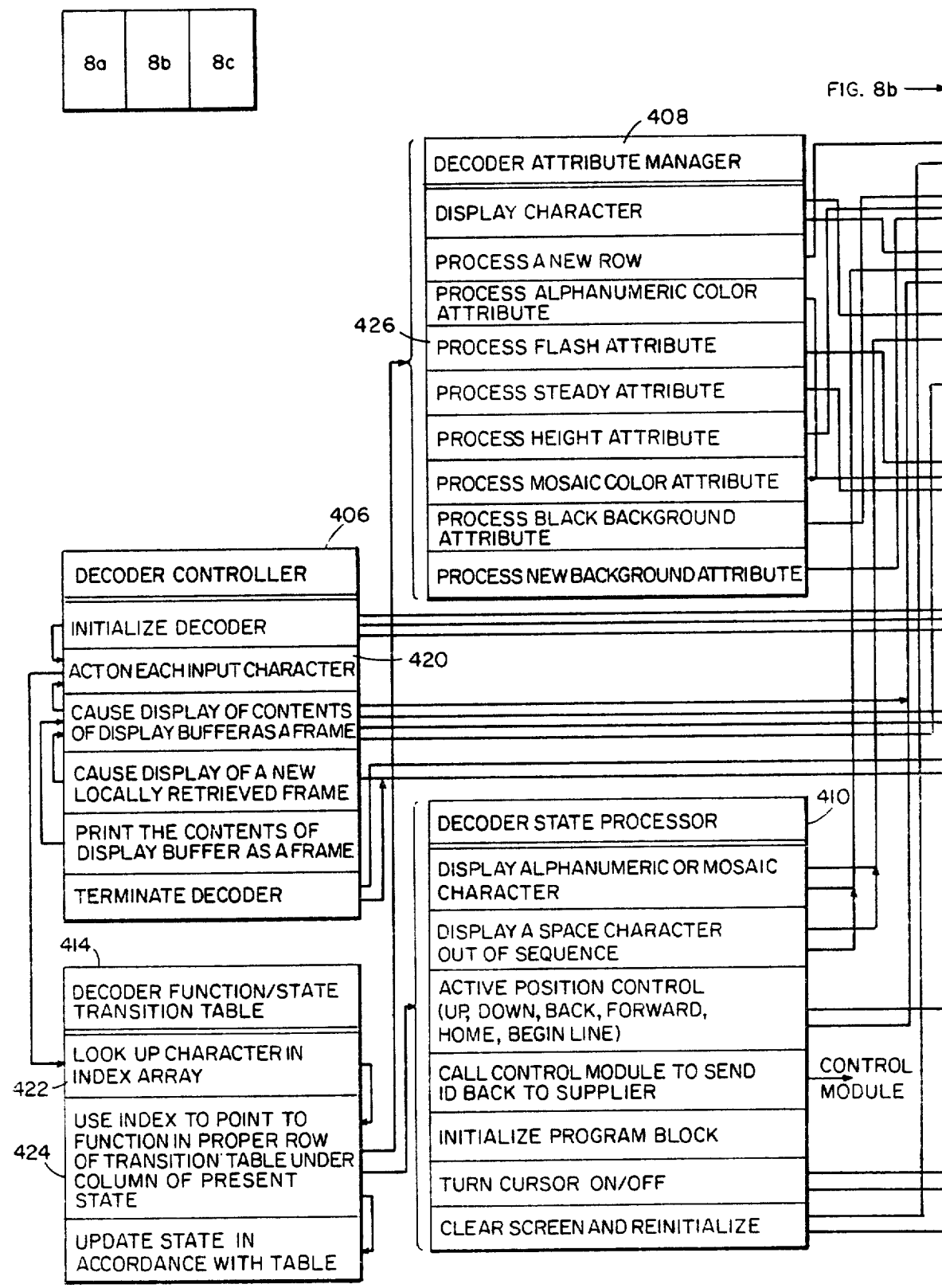
Figure 8B:
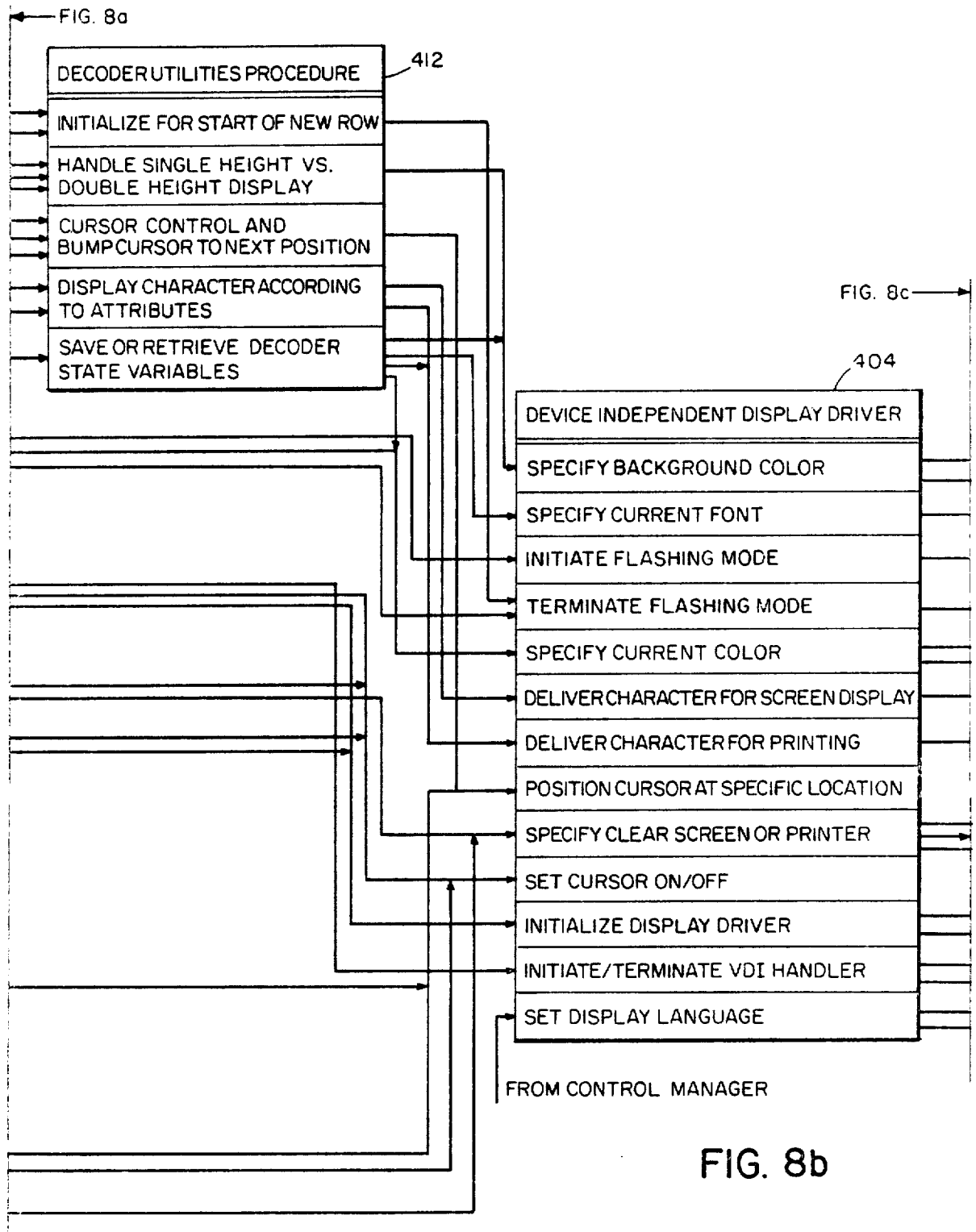
Figure 8C:
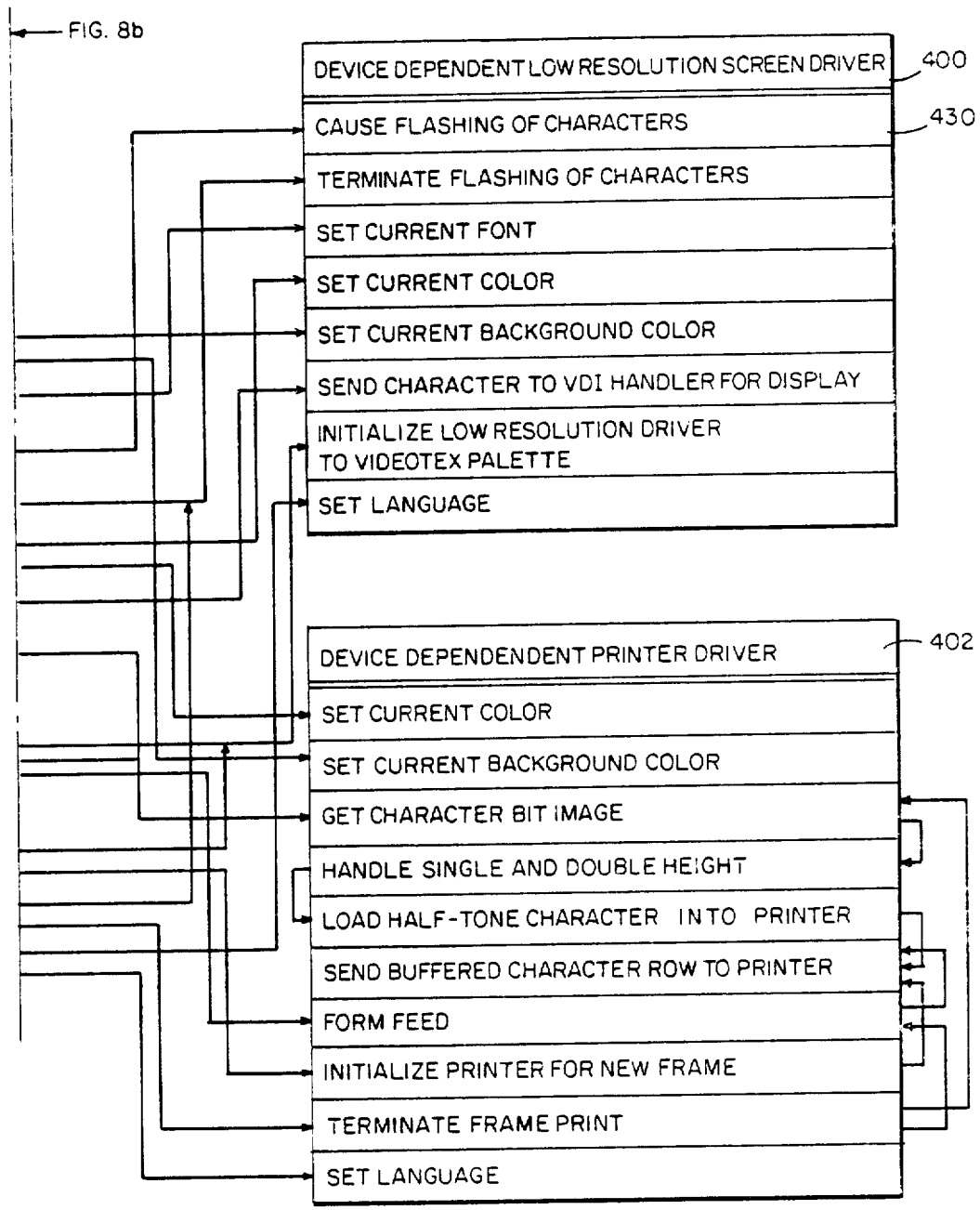

FIGS. 8a, 8b, 8c are a block diagram of the decoder and display/print modules of FIG. 2.

FIG. 9 is a representative portion of the index array of the decoder module.

FIG. 10 is a representative portion of the transition table of the decoder module.

Figure 11:
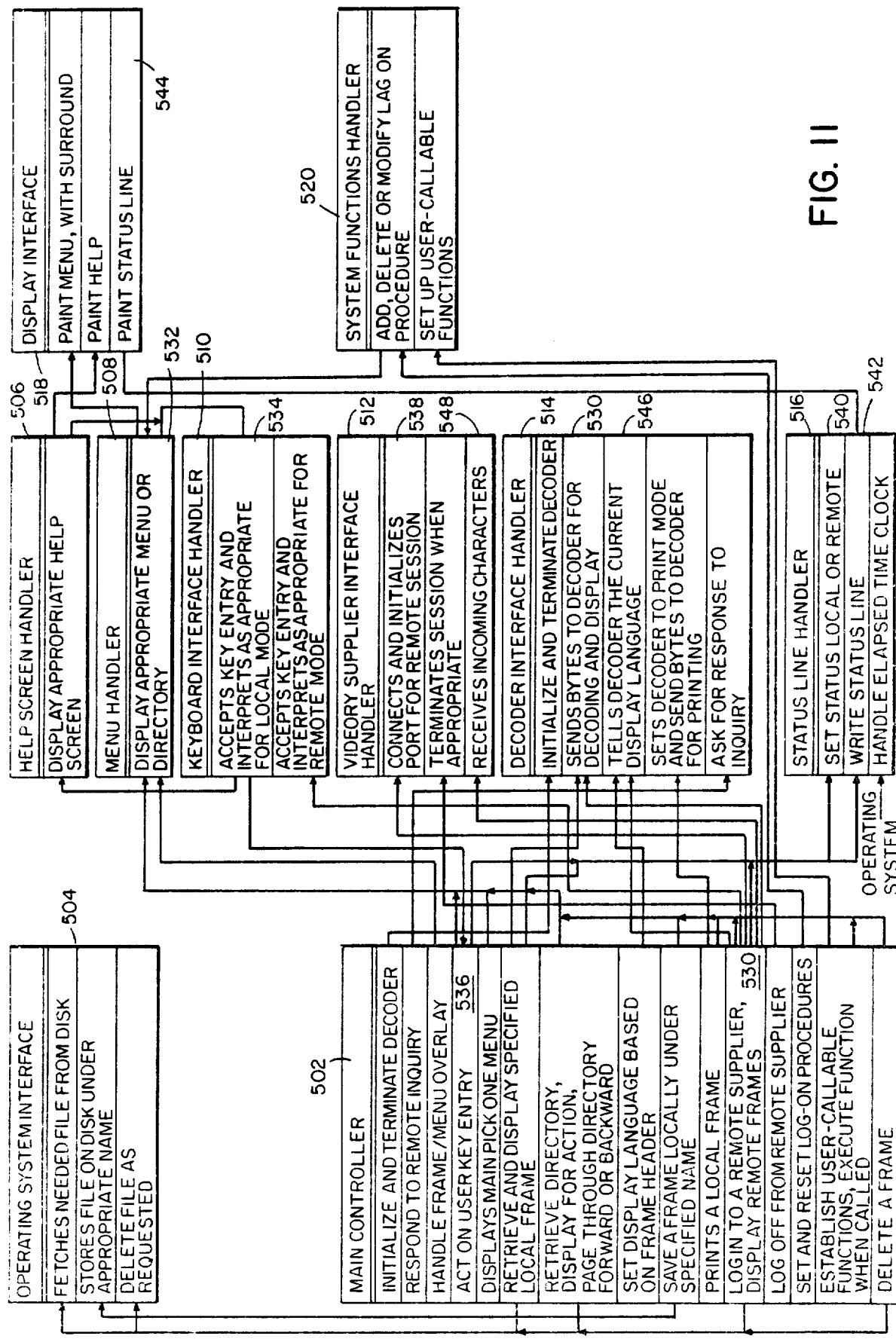

FIG. 11 is a block diagram of the control module of FIG. 2.

Structure and Operation

Figure 1:
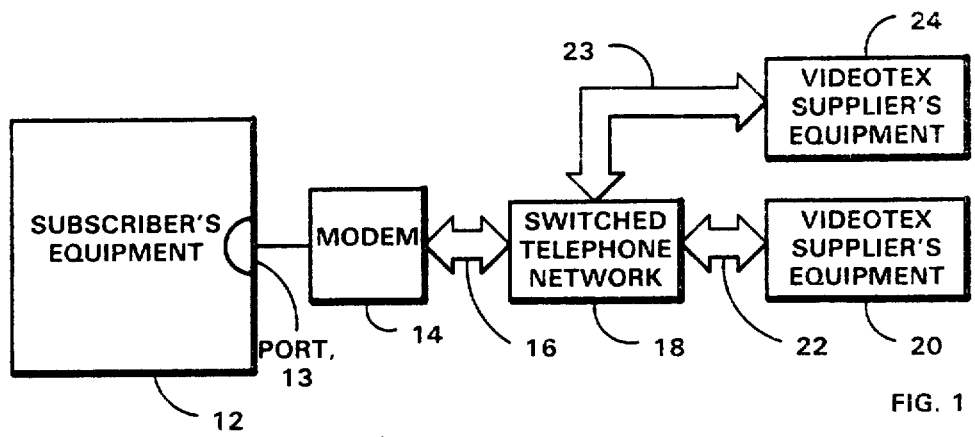
FIG. 1 is a block diagram of a videotex system.

Referring to FIG. 1, in videotex system 10, the subscriber's equipment 12 is connected through port 13 and via an asynchronous modem 14 (with a CCITT V 24/RS-232-compatible interface) and two-way channel 16 to the switched telephone network 18. The equipment (e.g., 20, 24) of different videotex suppliers is also connected, via two way channels 22, 23, to the switched telephone network 18.

Channels 16, 22, 23 and the switched telephone network 18 enable relatively high speed (e.g., 1200 bits per second) communication of streams of encoded bytes representing frames of information from a supplier's equipment 20, 24 to the subscriber's equipment 12 and relatively low speed communication (e.g. 75 bits per second) of data representing requests and responses from subscriber's equipment 12 to supplier's equipment 20, 24. The communication rate can be the same in either direction, e.g., 2400 bits per second for both sending and receiving.

Referring to FIG. 2, subscriber's equipment 12 includes a control module 30 connected (via port 13) to modem 14, and to decoder and display/print modules 32, 34. Decoder and display/print modules 32, 34 are connected through screen driver 37 to an industry standard red, green, blue, color CRT 36 and to a printer 38 (Wang Matrix Printer PC PM010). Control module 30 is also connected to keyboard 40 (a data entry device), and to disk file 42 (Wang diskette drive with 360 kilobytes storage capacity or a Wang Winchester drive). Control, decoder, and display/print modules 30, 32, 34 comprise a processor 35 which is implemented as a Wang Personal Computer (PC-001) with 128 kilobytes of memory, an asynchronous interface card for interaction with the port, an MS/DOS operating system version 2.01, BIOS version 1.21, and Wang Videotex decoder software release 1.0. The Wang Personal Computer is described in U.S. patent application Ser. No.

440,668, filed Nov. 10, 1982, An Wang et al., Management Communications Terminal, incorporated herein by reference.

Control module 30 manages the operation of the subscriber's equipment, accepts the received stream of encoded bytes for each frame from modem 14, temporarily stores the frame in a buffer provided in decoder module 32, directs the decoder module 32 to decode the stored frame, directs the display module 34 (which, in turn controls screen driver 37, a Wang Industry Standard Monitor/Graphics Card, type PC-PM003) to display the decoded characters on CRT 36, directs when the printer 38 is to print the decoded characters, receives and decodes the subscriber's requests and responses from keyboard 40, and as appropriate either acts upon them or encodes them in accordance with the proper protocol and delivers them to modem 14 for transmission to the appropriate videotex supplier.

Decoder module 32, when instructed to do so by control module 30, decodes the encoded bytes of a frame stored in disk file 42 and delivers the decoded characters and attribute instructions to display/print module 34 for display on CRT 36.

Display/print module 34 either delivers a frame of bits to screen driver 37, or a stream of groups of bits, each corresponding to a character, to printers 38. Screen driver 37 uses a bit-map technique to drive CRT 36 to display the frame characters, and includes a screen buffer having storage locations corresponding to each screen location.

In general, the subscriber's equipment 12 is arranged to enable the subscriber to work both with frames currently being delivered from the videotex supplier and frames which were previously received from a supplier, displayed, and then stored locally in disk file 42. Frames being currently delivered from a supplier are immediately displayed. The subscriber can interactively respond to options offered in such a displayed frame, or request other frames, by keying in the proper commands which are immediately transmitted back to the videotex supplier. Currently displayed frames can also be given names by the subscriber and stored (e.g., in organized groups) in directories established in disk file 42, for later retrieval and display.

In addition to displaying information frames, the subscriber's equipment also can display stored menus which describe options that can be chosen by the subscriber using the appropriate keys on keyboard 40. Help screens may also be displayed to provide information to a subscriber who is confused about how to proceed.

The system operates in either of two modes selected by the subscriber, unconnected or connected. In the connected mode, the subscriber's equipment is attached through modem 14 and the switched telephone network to a videotex supplier. Operating in the connected mode typically entails telephone toll charges and subscriber fees. In the connected mode, the subscriber may work either with frames being supplied from the videotex supplier or with frames previously stored. In the unconnected mode, there is no connection to a videotex supplier and the subscriber may only print or display locally stored frames.

When the subscriber, by appropriate keyboard commands, begins a videotex session, the system enters the unconnected mode. The control module 30 gets and causes display/print module 34 to display the menu shown in FIG. 3a. The same menu also appears at any later time in the session when requested by the subscriber if the system is then in the unconnected mode. The menu offers the subscriber the options of displaying a local frame (i.e. a frame already stored in a disk file 42), storing a frame, printing a frame, logging on to remote viewdata (i.e., calling and connecting to a videotex supplier), or performing system functions. At the lower right-hand corner of the menu, instructions are provided to the subscriber. The subscriber elects an option by using the space bar on keyboard 40 to move cursor 43 to the desired option and then by pressing the execute key. Alternatively by pressing the cancel key the subscriber can remove the menu.

If the subscriber selects the option of logging on to a remote videotex supplier, control module 30 next gets and causes display/print module 34 to display the menu in FIG. 3b, which offers the subscriber options of several different videotex suppliers.

The subscriber can elect one of the options (again using the space bar and execute keys as instructed at the bottom of the menu) and is then presented with the display in FIG. 3c, which gives the telephone numbers, subscriber ID, and password for calling and being connected to the selected videotex supplier. The subscriber may then manually dial the telephone number, the ID is automatically transmitted, and the password is typed in by the subscriber in the spaces provided. Alternatively, the system could be arranged for automatically dialing the selected videotex supplier and delivering the ID and password to effect the connection.

Once the connection is made, the control module enters the connected mode during which it accepts frames from the videotex supplier, delivers them byte-by-byte to the decoder module 32 where they are stored temporarily in the decoder buffer, and directs decoder module 32 to decode them and to cause display/print module 34 to display them on the CRT. Control module also accepts from the keyboard any requests or responses intended for transmission to the videotex supplier and effects the transmission. Thus the subscriber can interact with the videotex supplier in the normal way.

From time to time during operation in the connected mode, the subscriber may wish temporarily to interrupt his current activity. For example, he may wish to change the displayed frame from the one being sent by the remot supplier to one stored in disk file 42. By touching the cancel key, control module 30 will superimpose over the currently displayed frame, the menu of FIG. 3d, which provides the subscriber with options similar to the menu of FIG. 3a except that the fourth option enables the subscriber to log-off from the remote videotex supplier. The superimposed menu doesn't entirely obscure the current frame, but leaves a portion of it on one side and at the top visible to the subscriber.

If the subscriber elects the log-off option, control module 30 causes the menu of FIG. 3e to be displayed. The subscriber can then confirm his intention to log-off (by pressing execute), after which control module 30 effects the log-off, and the system enters the unconnected mode. The displayed status line (described below) then no longer includes the elapsed connect time.

In either the connected or unconnected modes, the menus of FIGS. 3a, 3d give the subscriber the option of storing the currently displayed frame, e.g., a current frame sent from a videotex supplier, in disk file 42.

If that option is chosen, control module 30 causes the menu of FIG. 3f to be displayed. The subscriber may then choose and enter a name for the frame in the space provided, or before doing so may ask to see the frame directory (by pressing the indent key, i.e., program function key #1). In the latter case the control module 30 will cause the display of the menu of FIG. 3g listing the name of the current directory, the disk drive on which it resides, and the names of all local frames stored in disk file 42, or, if the directory is empty, will display a menu which says, "The Directory is Empty".

Once the subscriber enters the frame name on the menu of FIG. 3f, control module stores the frame in that directory under that name for later easy retrieval. If the chosen frame name is already being used, control module 30 will cause the menu in FIG. 3h to be displayed to indicate that fact and permit the subscriber to confirm that the current frame should replace the old stored frame of the same name.

Thus the store frame function can be used to store a frame currently being displayed from the videotex supplier or to refile or rename a locally stored frame.

In either the connected or unconnected mode, the menus of FIGS. 3a, 3d, also permit the subscriber to display a stored local frame. Thus even when the system is connected to a remote supplier, the subscriber may temporarily interrupt the interactive session, while remaining in the connected mode, and display a stored local frame. When the subscriber elects to display a local frame, the menu of FIG. 3i is displayed. The subscriber then may enter the name of the frame to be displayed, or use the cursor to indicate the frame. The control module 30 then retrieves and causes the requested frame to be displayed.

Likewise, in either the connected or unconnected mode, the subscriber can elect to print a displayed frame. Control module 30 then causes the menu of FIG. 3j to be displayed, enabling the subscriber to select small or large format print, which governs the overall size of the printed frame. Based on the selection, the control module 30 via display/print module 34 causes printer 38 to print the currently displayed module.

Finally, in either connected or unconnected mode, the menus of FIGS. 3a, 3d, allow the subscriber the option of performing various system functions. When that option is selected, control module 30 causes the menu of FIG. 3k to be displayed and allows the subscriber to select one of four system functions: modify log-on parameters, modify storage parameters, delete stored frame, and select character set.

When the subscriber elects the option of modifying log-on parameters, control module 30 causes the menu of FIG. 3l to be displayed. The subscriber may then elect either to delete a log-on procedure, or to modify or create a log-on procedure.

If a log-on procedure is to be deleted, the menu of FIG. 3m is displayed, enabling the subscriber to select the log-on procedure to be deleted, followed by the menu of FIG. 3n, which confirms the subscriber's wish to delete that procedure.

If the subscriber elects to modify or create a log-on procedure, control module 30 causes the display of a succession of menus, FIGS. 3o through 3bb, which enable the subscriber to define or change the values of various parameters needed to establish a connection to a particular videotex supplier, and protocol information needed for proper interaction with the supplier.

In particular, the subscriber can specify or change (FIG. 3o) a short name for the procedure, (e.g. "Prestel" to identify the procedure used to call and connect to the Prestel service); the serial communications port of the subscriber's equipment at which the connection to the modem is made and whether the transmit/receive rate is to be equal in both directions or different (split) for transmission and reception (FIG. 3p); the baud rate for receiving data (FIG. 3q), for transmitting data (FIG. 3r), or for receiving and transmitting data at equal speeds (FIG. 3s); the number of bits per character, the stop bit length, and the parity protocol (FIG. 3t); the error substitute action and character code, and the duplex mode (FIG. 3u); the character set (FIG. 3v); the subscriber identification number and subscriber password (FIG. 3w); the telephone numbers of the videotex supplier (FIG. 3x); the proper log-off, back up frame, repeat frame, and home frame codes for transmission to the particular videotex supplier to control the delivery of frames (FIG. 3y); user keyboard names and codes to be described below (FIG. 3z); the choice of displaying or not displaying the procedure as part of the log-on menu (FIG. 3aa); and a confirmation of the storage of the just-defined procedure (FIG. 3bb).

Each frame available from a videotex supplier has an associated identifier assigned by the supplier. For example the weather forecast might be assigned the code *3097#. The current weather forecast frame is always available by sending that identifier to the supplier. Using the menu of FIG. 3z, the subscriber can enter the code and give it a keyword name, e.g., weather. Available user keywords can be displayed by pressing the dec tab key, i.e., function key #4, which causes the menu of FIG. 3jj to be displayed.

When the subscriber selects the modify storage parameters option of FIG. 3k, control module 30 causes the menu of FIG. 3cc to be displayed, which enables the subscriber to specify the current directory of stored local frames (i.e., the one to which frames are sent for storage and from which stored frames are retrieved) and specify the disk drive on which it is to reside.

When the subscriber selects the delete stored frame option of FIG. 3k, the menu of FIG. 3dd is presented, enabling the subscriber to name the file to be deleted.

When the subscriber selects the select character set option of FIG. 3k, the menu of FIG. 3v is displayed enabling the user to select the character set, i.e., the character font (e.g. English, German, Scandinavian, or Belgian) which will be used in displaying the frames.

When certain options are selected by the subscriber from a menu, the control module causes a display on the screen of either a message that the requested option has been executed (the possible execution messages are listed in FIG. 3ee) or an error message (the possible error messages are listed in FIG. 3ff). In response to the subscriber naming a frame which is missing or defective, the message in FIG. 3gg is displayed. When the subscriber names a directory, the control module 30 may, if appropriate, display the error messages of FIGS. 3hh and 3ii.

Referring to FIG. 3kk, whenever a menu is to be shown to a subscriber while a frame of information is being displayed, the menu is overlaid on the frame so that portions of the frame are still visible around the periphery of the screen. If the subscriber wishes to uncover the entire frame, he presses the "cancel" key to page through the hierarchy of menus until a menu at the top of the hierarchy appears. Pressing "cancel" again will uncover the entire current frame.

Whenever a menu is being displayed, the subscriber may take different actions by pressing different keys. The available actions depend on which menu is being displayed. Some of the available actions are indicated at the lower right of the frame. Generally the cancel key is used to remove the present menu and return to the prior menu. If there is no prior menu the cancel key removes the menu, leaving the underlying information frame fully displayed. The shift cancel key causes either the main menu (FIG. 3a or FIG. 3d) to be displayed, or causes the videotex session to be terminated. The space bar is used to move the cursor. The execute key is used to execute the option selected by the subscriber. The indent key (function key #1) displays the frame directory. The help key causes a help frame (described below) to be displayed.

When no menu is being displayed the shift cancel key causes the main menu to be displayed.

The actions available to the subscriber at any time can be seen by pressing the help key, which causes a help frame to be displayed.

For example, referring to FIG. 4, the help frame which appears if the help key is pressed while the connected main menu is displayed lists the available functions. Successive strokes of the page key (function key #2) causes the modem to be alternately ignored or acknowledged. The center key (function key #3) allows the status line (described below) to be displayed or removed. The format key (function key #6) allows the underlying frame behind an overlaid menu to be displayed or removed.

Referring to FIGS. 5a, 5b, the system is capable of displaying a status line with every frame and menu indicating whether the subscriber's equipment is unconnected to the videotex supplier (FIG. 5a), or is connected (FIG. 5b) in which case the elapsed time since the connection was begun is shown at the end of the line. In this way, the subscriber is always alerted to the fact that he is incurring charges while connected, even though he may be working with locally stored frames. The subscriber can choose whether or not to display the status line using the center key.

Different videotex suppliers use different encoding schemes for the data which make up frames of information in their respective systems. Control and decoder modules 30, 32 may be capable of recognizing, for each frame to be dgcoded, the identity of the videotex system in accordance with which the encoding was done, and must be capable of applying the appropriate decoding rules for the particular frame being decoded.

Each frame stored in disk file 42 includes a frame header of 64 bytes (of which 42 are actually used). The frame header identifies (a) the name assigned to the frame by the subscriber, (b) a unique arbitrary frame identifier assigned by the videotex supplier, (c) a frame offset indicating the number of bytes from the start of header to the start of the frame data, (d) the number of bytes of data in the frame, (e) the encoding protocol (e.g. ASCII, or Prestel), (f) the language (e.g. English, German, Scandinavian, or Belgian), (g) the version of the system software, (h) the version of the encoding protocol, and (i) the videotex supplier. By storing this information as a frame header, decoding, frame retrieval, and file management are made more accurate and efficient.

The interaction between control module 30 and decoder module 32 is accomplished in such a way that each of the modules executes certain procedures when told to do so by the other module.

In particular, the decoder module 32, when told to do so by control module 30, performs any necessary decoder initialization (and returns a flag to the control module 30 if initialization fails); performs any necessary de-initialization (and returns a flag if de-initialization fails); accepts and decodes a single byte (and returns a flag if action is required by the control module, for example if the decoded character represents a request by the videotex supplier to have the subscriber's equipment send back its ID number); causes the display/print module 34 to display the entire contents of the decoder buffer onto the CRT as a displayed frame beginning with the first character in the decoder buffer; causes the display/print module 34 to display selected portions of the decoder buffer onto the CRT to cause display of selected rows of an information frame; causes display/print module 34 to print the current contents of the display buffer (and returns a flag if the printing failed); and sets the decoder character font (e.g., either English or German).

Conversely, the control module 30, when instructed to do so by decoder module 32, clears the display screen (while maintaining the status line on the screen); returns to the decoder module an index value indicating the language specified by the frame file header associated with the current local frame; and returns to the decoder module an index value indicating the language specified by the current log-on procedure.

The interaction between the control module 30 and decoder module 32 is also governed by a set of common flags and variables maintained by the decoder module 32. The common flags and variables are a flag set by the control module 30 to indicate that characters sent to the decoder module should be displayed; a flag set by the control module 30 to indicate that "conceal" fields (i.e., portions of the information frames which may need to be concealed, such as answers to quiz questions posed in the frames) should be concealed; an address of the decoder buffer set by the decoder; an address set by the decoder to indicate a number block of the videotex supplier; a flag which is set when a request is made and reset when the request has been satisfied; a value set by the decoder to indicate the videotex supplier's block number subject to modification; and a value set by the decoder to indicate an action requested by the videotex supplier. The action requested by the videotex supplier may be to send the supplier appropriate ID information or to indicate to the control module that the beginning of a remote frame (i.e., one being sent from the supplier) has been received.

While the decoding applicable to each type of videotex system must, of course, satisfy the protocol rules for that system, and thus be unique, decoder module 32 is arranged so that decoding for widely different videotex systems can proceed in similar ways. The decoding is accomplished by a table oriented system.

Before a frame of encoded bytes is received for decoding control module 30 causes decoder module 32 to set all positions in the decoder buffer to spaces. The received and decoded characters are then overwritten into the appropriate positions in the decoder buffer. Attribute codes are tagged before being stored to indicate that they relate to an attribute and are not themselves to be displayed.

Whenever a stored frame is to be displayed, decoder module 32 must decode the characters and attributes and deliver the decoded information to display/print module 34.

The decoding for each different protocol is accomplished by means of values stored in tables associated with that protocol. Based on the relevant protocol, the decoder follows a straightforward sequence of steps to decode each byte, using the tables for that protocol to produce a displayable alphanumeric or graphic character for each of the row-and-column positions of the display. The tables are called Frame, State, Character Font, and Transition.

The Frame table corresponds to the decoder buffer and has as many entries as there are positions in the display (e.g., 24 rows of 40 characters each in Prestel). Each entry in the Frame table is the encoded byte for the display position corresponding to that entry.

The Character Font table contains the bit-pattern information defining each one of, for example, 172 different characters which may be displayed as single-height and double-height characters, either alphanumeric, or contiguous or separated mosaics. For example characters may each be defined by an 8×8 bit pattern.

The State table contains values that indicate the state attributes of the display which are applicable at a given time, for example to effect mosaic or alphanumeric, color of foreground, color of background, or position in line, and to locate the place in the character table where the relevant character definition is found.

The Transition table has entries, indicating for the current encoded byte and the current state, what action is to be performed and what the next state is to be. For example, one entry in this table would be "put character C into line L, row K (using attributes specified in the State table)". Another would be "display current line from current position to end of line in background color (specified in the State Table)".

Referring to FIG. 6, the steps performed by decoder module 32 for decoding and displaying a stored frame (i.e., for repainting the screen) begin with clearing all display positions and initializing the state table (100). In the case of a current frame being delivered from the videotex supplier, the decoding steps begin at the entry print labeled "decode a character" (101). The decoder module 32 then executes a loop which has the following steps. The next encoded byte is either retrieved (102) from Frame table 104, or delivered directly from control module 30, as the case may be. On the basis of the byte value, and the current state (105), the decoder determines (108) what action is to be taken. Next, using the state table 106, the Transition table 112, and the Character table 118, the decoder determines what changes to the display are needed, if any, and executes them (114), i.e., by delivering the appropriate character definitions from the Character table 118, to the display/print module 34. Then, using the current state 106 and the Transition table 120, the decoder determines what state changes are needed and executes them (122) by modifying the State (123). Finally, the decoder returns to receive (102) the next byte from the control module, or gets the next byte from the Frame table, as the case may be, repeating the sequence until all encoded bytes in the frame have been processed.

The decoder module 32 and the display/print module 34 (FIG. 2) are implemented by a program (in "C" programming language) which is structured to provide in effect a set of elements to perform the jobs required of modules 32, 34. A given job is accomplished by a sequence of steps performed by different ones of the elements.

FIGS. 8a, 8b, 8c show the eight elements that make up modules 32, 34. Within each element is shown a list of steps included within the repertoire of steps which that device is capable of performing. The lines connecting various step in the different elements show the sequences in which steps are performed to accomplish a given job.

The eight elements consist of a device dependent low resolution screen driver 400, a device dependent printer driver 402, a device independent display driver 404, a decoder controller 406, a decoder attribute manager 408, a decoder state processor 410, a decoder utilities processor 412, and a decoder function/state transition table 414.

The device dependent low resolution screen driver 400 performs steps that generate control signals and provide bit patterns of the specific types needed by screen driver 37 and CRT 36 to display each frame of characters in an appropriate format, i.e., with the desired character font, the desired language, character color, background color, and flashing of characters. The inputs to driver 400 are detailed device-independent instructions about which characters are to be displayed, in which font, which language, with which background and character colors, and with which flashing characteristics. Color card (FIG. 2) 37 contains a screen memory which stores for each display pixel on CRT 36 four bits which together represent one of 16 different colors to appear in that pixel. Thus, the information which must be passed from processor 400 to color card 37 is the bits defining the colors for all pixels to be displayed.

The device dependent printer driver 402 plays a similar role as that of driver 400 but with respect to printer 38, that is it provides rows of detailed control signals and character bit images in a format which is compatible with the particular requirements of printer 38. Among other steps, driver 402 handles form feeding, initializes and terminates the printing, and deals with single-height and double-height rows. Printer 38 prints characters using an 8-bit by 8-bit dot matrix pattern. Thus, the information which must be passed from element 402 to printer 38 is the columns of 8-bits defining each character to be printed.

Both element 400 and element 402 perform their steps in response to steps performed in a device independent display driver 404. Driver 404 provides detailed instruction sufficient to specify all of the parameters needed by a particular display device, e.g., a printer or a cathode ray tube. Driver 404 provides those instructions in a generalized form usable by either driver 400, or driver 402 (or any other device dependent driver which may be used).

Driver 404 performs its steps in response to steps performed in one of four other elements 406, 408, 410, 412, which together serve to specify the characters to be displayed in a frame, the attributes of the display, including font, color, flashing or steady, and background color, character height, and the cursor attributes.

The decoder function/state transition table 414 takes each character to be decoded, looks it up in an index array which provides an index to the rows of the Transition table. The entry which is in the row pointed to and is under the column which represents the current state, is then executed by either the decoder attribute manager 408 or the decoder state processor 410.

The decoder attribute manager 408 supervises the execution of various character attributes including starting a new row, color, flash, and background, all in accordance with the decoded attributes from table 414.

Decoder utilities processor 412 provides various utility functions in response to instructions from devices 406, 408, 410, including cursor control, keeping track of decoder state variables, initializing for start of a new row of the frame, and handling single height or double height display.

The decoder state processor 410 manages the state of the display including the display of an alphanumeric or mosaic character, or of a space when a character is out of sequence, the control of the active display position for a CRT (including movements of the active position up, down, backward, forward, home and to the beginning of a line), the delivery of status information back to the Videotex supplier via the control manager, initializing the program block, turning the cursor on and off, and clearing and reinitializing the screen.

Referring to FIG. 9, the array index table comprises a number of columns (only a portion of one column of which is shown in FIG. 9). The column includes a number of characters, for example "capital B" and opposite each character a row number pointing to a row in the Transition table.

Referring to FIG. 10, the Transition table comprises an array (only a representative portion of which is shown). The rows have numbers corresponding to the row numbers derived from the array index table. In each row of the table are seven columns representing the action to be taken when the decoder is in each of seven different states. For example, when the decoder is in the display mode (the 0 column of the transition table), if a "capital A" is received, the function to be performed is to display that character. If the decoder were instead in the escape state (the 1 column of the transition table), the A would indicate an alpha font and color attribute to be set, namely alphanumeric RED in the case of Prestel. If the decoder were instead in the escape 1 state (the 2 column), the A would be an improper character and the function would be simply to display a space. The number after each function indicates the next state to be assumed.

The entries in the Transition table take the form of addresses, each of which points to a structure consisting of the name of the function to be performed and the number of the next state to be assumed. In decoding a character, the decoder uses the array index table to find the proper row in the Transition table, then uses the address found in the Transition table to find the name of the appropriate function to be performed.

As an example of the step sequences represented by FIGS. 8a, 8b, 8c, if the next character to be acted on by the decoder controller (420) is a "FLASH" attribute character (in the Prestel protocol), the decoder controller tells the transition table to look up that character in the index array (422). The Transition table uses the index to point to the FLASH function in the transition table (424). The FLASH attribute is then processed (426) by the decoder attribute manager which triggers the display driver to initiate flashing mode (428). The flashing mode in turn is implemented in a device dependent manner by a screen driver 400 which delivers (430) flashing control signals to screen driver 37.

The link between control manager 30 and decoder 32 represents information passing from control module 30 to decoder 32, including function calls (i.e., commands), common variables (i.e., data stored in a common memory), and returns (i.e., information sent in response to function calls). Function calls and returns are likewise passed back to control module 30 from decoder 32.

The overall operation of system 10 is managed by the control module, which is arranged to perform the following routines as required:

(1) initialize the asynchronous port 13 connected to modem 14, (2) at appropriate times close off the port 13 connected to modem 14, (3) look to the asynchronous port 13 for a byte received from the videotex supplier and check parity.

(4) look to the input buffer of keyboard 40 for a keyed in character, (5) deliver a byte to the asynchronous port 13 for transmission to the videotex supplier, (6) check keyed in characters to see if they are valid bytes under the videotex supplier's protocol, (7) tell the decoder module to stop sending characters to the display so that a help frame can be displayed, (8) store a current frame in the disk file under a name specified by the subscriber, (9) print a current frame via display/print module on printer 38,

(10) log onto videotex service,

(11) log off,

(12) store a specified frame having a specified identifier from the videotex supplier,

(13) transmit a frame number or other comments to the videotex supplier, and

(14) display appropriate menus.

The control module passes bytes to the decoder without regard to the information contained in them, that is, its treatment of each frame byte is essentially protocol independent.

Referring to FIG. 7a, the control module continually cycles through a main processing loop with two embedded loops. The routing of the process through the loops depends on two two state variables: "finished" and "show-display". When finished (200) is true the control module ends the videotex session. When finished is false but show display (202) is true, the character processing loop 204 is entered. When finished is false and show display is false, the menu display and processing loop 206 is entered.

In the menu display and processing loop, the system first determines (207) whether the menu is to be overlaid on the information frame with some of the frame remaining visible. If so, the control module instructs the decoder to clear only a portion of the decoder (209) buffer to make room for the overlay. Otherwise, the entire decoder buffer is cleared (211). Next, if the system is in the (logged-in) connected mode (208), the connected mode main menu is displayed (210); otherwise the unconnected mode main menu is displayed (212). Then, based on the option chosen by the subscriber (214, 216, 218, 220, 222, 224, 226, 228, 230, 231), the system either (a) sets show display to true (232) and returns to begin (which causes the menu to be removed and the current frame to be displayed), (b) retrieves a local frame (234) to be displayed and sets show display true, (c) stores a frame (236) and returns to begin, (d) prints a frame (238) and returns to begin, (e) logs on (240) and sets show display true (causing the received frame to be displayed), (f) logs off (242) and sets show display true, (g) displays the system functions menu (244), (h) executes any user functions (246) and sets show display true, (i) sets finished true (248) if the subscriber has pressed shift cancel, or (j) resets the overlay flag to change from an overlaid to a non-overlaid display or vice versa.

If the system functions menu is displayed (244), then based on the option chosen by the subscriber (250, 252, 254, 256, 260, 262) the system, with the subscriber's assistance, either (a) modifies the log-on procedure (264), (b) modifies the frame directory (266), (c) deletes a stored frame (268), (d) effects a character selection (270), or (e) returns to (244) or to begin.

In character processing loop 204, if a character is to be displayed (280), the character is fetched and delivered to the decoder for decoding and display (282). If a keyboard character is to be processed (284), the character is either transmitted to the videotex supplier (286) or is executed as a command. If the help key is pressed (290), the appropriate help menu (291) is displayed. If the cancel or shift cancel is pressed (292, 294), show display is set false (296) causing the system to return to the menu display and processing loop to display a menu. If the subscriber asks to have hidden information in the frame revealed (298), the information is revealed (300). If the subscriber calls a user function (302), the user function is executed (304).

Referring to FIG. 7c, the status line is controlled by a status line routine (350) which begins by determining (352) whether a display status line flag is true (indicating that the status line is to be displayed). If true, the system determines (354) whether the mode is connected or unconnected. If connected, it causes the display (356) of the elapsed time check at the end of the status line. In the next step, the system determines (358) whether the currently displayed frame is a stored local frame from the disk file or a remote frame being delivered from the supplier and accordingly displays either "LOCAL FRAME" (360) or "REMOTE FRAME" (362) at the beginning of the status line. The system determines (364) whether the center key (function key #3) has been pressed and if so switches (366) the state of the display status line flag to cause the status line to be removed (if previously displayed) or displayed (if previously absent).

The control module is implemented by a program (in the "C" programming language) which is structured to provide in effect a set of elements to perform the jobs required of the control module. A given job is accomplished by a sequence of steps performed by different ones of the elements.

FIG. 11 shows the ten elements that make up the control module. Within each element is shown a list of steps included within that element's repertoire. The ten elements consist of a main controller 502, an operating system interface 504, help screen and menu handlers 506, 508, a keyboard interface handler 510, a videotex supplier interface handler 512, a decoder interface handler 514, a status line handler 516, a display interface 518, and a system functions handler 520.

Help screen handler 506 displays appropriate help screens. Menu handler 508 displays appropriate menus or directories. The operating system interface 504 fetches needed files from the disk, stores files on disk under specified names, and deletes files from disk as appropriate. Keyboard interface handler 510 accepts keyboard entries and treats them appropriately either as commands when in local mode or as commands or characters when in the remote mode.

Videotex supplier interface handler 512 connects and intializes the port for a remote session, terminates the session as appropriate, and receives incoming characters.

Decoder interface handler 514 manages the initialization and termination of the decoder, sends bytes to the decoder for decoding and display or printing, tells the decoder the current display language, and asks the decoder to give it the responses to videotex supplier inquiries.

Status line handler 516 sets the status to local or remote, manages writing the status line on the screen, and handles the elapsed time clock under control of an interrupt from the operating system.

Display interface 518 causes the display screen to be painted with a menu (with or without surround), or with a help screen, or with the status line, as appropriate.

System functions handler 520 adds, deletes, or modifies the log on procedures and sets up user callable functions.

Main controller 502 supervises the performance of all of the jobs to be performed by calling on the other elements of FIG. 11 as required.

As an example of the step sequences represented by FIG. 11, when called upon to do so by the user, main controller 502 logs in to a remote videotex supplier and displays remote frames (530) by displaying the menu showing the selection of log-on procedures (532), accepting the user's key entry (534) that indicates the log-on procedure to use, acting on that entry (536) by connecting and intializing the port for a remote session (538), setting the status line remote (540), writing the status line (542) (which cause the status line to be painted—544), telling the decoder the current display language (546), receiving incoming characters (548), and sending them to the decoder for decoding and display (550).

Other embodiments are within the following claims. For example, the supplier might be located within the same facility as the subscriber, thus requiring no modem.

What is claimed is:

1. Apparatus for locally displaying frames of digital information received from a central supplier, comprising
   a port connectable to the central supplier for receiving at least one of said information frames from the central supplier,
   a display device connected to locally display at least one of the information frames received from the central supplier,
   a storage device connected to locally store, after it has been displayed, as a stored frame for later redisplay, at least one of the information frames received from the central supplier, and
   a processor connected to be responsive to said port and said storage device and comprising
   means for displaying, while the port is connected to the central supplier, an indication that the port is connected.

2. The apparatus of claim 1 wherein an expense is incurred when said port is connected to said central supplier, and the means for displaying is further arranged to display an indication of said expense.

3. The apparatus of claim 2 wherein said indication of said expense is displayed on said display device simultaneously while an information frame is being displayed.

4. The apparatus of claim 1 wherein the means for displaying is further arranged to display an amount of time which has elapsed since the port was most recently connected.

5. The apparatus of claim 1 wherein the processor further comprises
means for enabling a user to selectively either display or not display the indication that the port is connected.

6. The apparatus of claim 1 wherein the means for displaying is further arranged to display an indication of whether a said information frame being displayed is a stored frame from the storage device.

7. The apparatus of claim 6 wherein said processor further comprises
means for enabling a user to selectively either display or not display the indication of whether a said information frame being displayed is a stored frame from the storage device.

8. The apparatus of claim 1 wherein the means for displaying is further arranged to display, while said port is unconnected to the central supplier, an indication that said port is unconnected.

9. The apparatus of claim 1 further comprising a data entry device for enabling the entry of data into said apparatus, the data including commands representing actions to be taken with respect to the information frames, and wherein the processor further comprises
means for delivering to the display device at least one menu frame for visually indicating possible actions which may be taken with respect to the information frames, including the actions of switching back and forth between displaying the information frames as they are received from the supplier, and displaying stored frames from the storage device, and
means responsive to the data entry device for accepting and executing entered commands corresponding to the possible actions.

10. Apparatus for obtaining access via a switched communications network to a central supplier of frames of digital information for obtaining said frames to be visually displayed locally, comprising
means for delivering to the central supplier via the network stored coded information required by the central supplier as a condition to allowing access to the central supplier,
a display device connected to display the frames of digital information,
a data entry device connected to enable the entry of data into the apparatus, including commands, and
a processor comprising
menu means connected to send to the display device a menu frame identifying the central supplier as being accessible, and
log-on means connected to be responsive to the data entry device for accepting and executing an entered command to obtain access to the supplier, by triggering the delivering means to send the coded information.

11. The apparatus of claim 10 wherein the coded information delivered to the supplier includes a subscriber identifier.

12. The apparatus of claim 10 further comprising means for holding protocol information about a protocol specified by the supplier and governing the information frames of the supplier.

13. The apparatus of claim 12 wherein each information frame comprises a collection of bytes, each comprising a number of bits, and the means for holding is arranged to hold protocol information which includes said number of bits in each byte.

14. The apparatus of claim 12 wherein the means for holding is arranged to hold protocol information which includes a table of commands each associated with an instruction specified by the supplier for retrieving information frames from the supplier, each command corresponding to a key on the data entry device, and the processor further includes means responsive to the data entry device for sending to the supplier, in responsive to a key being pressed, the instruction associated with the command corresponding to the key which was pressed.

15. The apparatus of claim 14 wherein said instructions specified by the supplier include instructions to retrieve a prior information frame, to repeat a presently retrieved information frame, to log off, and to go to a home frame.

16. The apparatus of claim 12 wherein the processor further comprises means for specifying and updating the protocol information held in the means for holding.

17. The apparatus of claim 10 wherein the processor further comprises means for specifying and updating, by data entered through the data entry device, the coded information to be delivered to the supplier when access to the supplier is commanded.

18. The apparatus of claim 17 wherein
the menu frame sent by the menu means identifies at least a plurality of central suppliers, and the log-on mens is responsive to the data entry device for accepting and executing an entered command to obtain access to one of said suppliers by triggering the delivering means to send to that one supplier the coded information required by it.

19. Apparatus for obtaining access via a switched communications network to a plurality of central suppliers of frames of digital information, each requiring its own coded information, for obtaining said frames to be visually displayed locally, comprising
means for delivering to one of said central suppliers via the network stored coded information required by said one central supplier as a condition to allowing access to said one central supplier,
a display device for displaying the frames of digital information,
a data entry device for enabling the entry of data into the apparatus, including commands, and
a processor comprising
menu means connected to send to the display device a menu frame identifying said one central supplier as being accessible, and
log-on means connected to be responsive to the data entry device for accepting and executing an entered command to obtain access to said one supplier, by triggering the delivering means to send the coded information.

20. Apparatus for retrieving selected frames of information from a central videotex supplier of the information frames, each information frame having an associated unique identifier assigned by the supplier for retrieving the frame, the apparatus comprising
a display device connected to display the information frames,
storage means connected to store the identifier and a unique keyword selected by an operator and associated with the identifier,
menu means connected to display on the display device a menu frame containing the keyword,
data entry means connected to enter into the apparatus a request for retrieval of a selected information frame by moving a cursor to the keyword associated with the selected information frame, and a processor connected to be responsive to the data entry means for retrieving the information frame in response to the entry of the request by transmitting the associated identifier to the supplier.

21. The apparatus of claim 20 wherein the data entry means is further arranged for entering the request by typing in the keyword.

22. The apparatus of claim 20 wherein the processor comprises means for enabling specification and updating of each said keyword appearing on the menu frame and the identifier associated with each keyword by commands entered through the data entry means.

23. Apparatus for locally storing frames of digital information received from a central videotex supplier, comprising a port connectable to the central supplier for receiving at least one of the information frames from the central supplier, a display device connected to locally display at least one of the information frames received from the central supplier, a storage device connected to locally store, after it has been displayed, as a stored frame for later redisplay, at least one of the information frames received from the central supplier, a data entry device connected to enable the enable of data into the apparatus, and a processor comprising means connected to accept from the data entry device a name specified by a subscriber to be associated with a particular displayed information frame, means connected to store the particular information frame in the storage device together with the associated name, and means connected to retrieve the particular information frame from the storage device in response to entry through the data entry device of a command corresponding to the name specified for that frame.

24. The apparatus of claim 23 wherein the processor further comprises means connected to group information frames into directories, and means connected to accept from the data entry device commands designating in which one of said directories a particular displayed frame is to be stored.

25. The apparatus of claim 24 wherein the processor further comprises means for displaying on the display device a menu listing by name the information frames stored in a given directory, and means for accepting from the data entry device a command corresponding to the name of an information frame for retrieval from the directory.

26. The apparatus of claim 25 wherein the command is entered by steps which include moving a cursor to the name of the information frame on the menu.

27. The apparatus of claim 25 wherein the command is entered by steps which include typing the name of the information frame on the data entry device.

28. Apparatus for locally storing frames of digital information received from one of a plurality of central videotex suppliers, comprising a port connectable to said one central supplier for receiving at least one of the information frames from said one central supplier, a display device connected to locally display at least one of the information frames received from said one central supplier, a storage device connected to locally store, after it has been displayed, as a stored frame for later redisplay, at least one of the information frames received from said one central supplier, a data entry device connected to enable the entry of data into the apparatus, and a processor comprising means connected to accept from the data entry device a name specified by a subscriber to be associated with a particular displayed information frame, means connected to retrieve the particular information frame in the storage device together with the associated name, and means connected to retrieve the particular information frame from the storage device in response to entry through the data entry device of a command corresponding to the name specified for that frame, means connected to for group information frames into directories, means connected to accept from the data entry device commands designating in which directory a particular displayed frame is to be stored, and means connected to accept from the data entry device commands for storing in a single directory frames received from different suppliers.

29. Apparatus for printing frames of digital information received from a central videotex supplier, comprising a port connectable to the central supplier for receiving at least one of the information frames from the central supplier, a printing device connected to locally print at least one of the information frames received from the central supplier and, a processor comprising means connected to deliver to the printer digital information corresponding to an information frame to be printed, and means connected to configure the digital information to cause the printed information frame to be one of a plurality of selectable overall sizes.

30. The apparatus of claim 29 further comprising a data entry device for enabling the entry of data into the appratus, and wherein the processor further comprises means for accepting from the data entry device commands corresponding to the different selectable overall sizes.

31. Apparatus for locally decoding a stream of bytes representing a frame of information received from a videotex supplier, comprising means for receiving each byte in turn for decoding, means connected to store a table of entries each indicating what action is to be performed with respect to each byte based on the byte and on a current state of the apparatus, and means connected to decode each byte by finding an entry in the table corresponding to the action to be performed and thereafter performing that action.

32. The apparatus of claim 31 further comprising
means for updating the current state of said apparatus, after each byte is decoded, in accordance with the current state of said apparatus and the decoded byte.

33. The apparatus of claim 31 further comprising
means connected to store an index array indicating, for each said byte, a location in said table wherein said action to be performed will be found, given said current state.

34. The apparatus of claim 31 wherein said current state is a display state and said action to be performed is to display a character corresponding to said byte.

35. The apparatus of claim 31 wherein said current state is other than a display state and said action to be performed is to implement a visual attribute of said frame as specified by said byte.

36. The apparatus of claim 31 wherein, when said apparatus occupies a particular state, certain said bytes, according to a predetermined protocol for encoding said bytes, cannot properly appear in said stream of bytes, and
wherein said entries in said table corresponding to: (1) said certain bytes, and (2) said particular state, indicate that said action to be performed is to display a space.

37. The apparatus of claim 31 wherein the entries in said table correspond to a Prestel encoding protocol.

38. Apparatus for locally processing frames of information received from central videotex suppliers, different frames being encoded in accordance with different protocols, comprising
means connected to locally store the information frames,
means connected to locally display the frames,
means connected to decode the locally stored frames as they are displayed, and
means connected to tag each stored frame with a header indicating one of said different protocols as having been used for encoding the frame,
the means connected to decode being arranged to decode each frame in accordance with the protocol indicated by the header of the frame.

39. Apparatus for displaying a frame of information represented by a stream of bytes received from a videotex supplier, said bytes being encoded in accordance with a particular videotex protocol, comprising
a device for visually displaying said frame based on bit images that are encoded in accordance with a display device protocol different from said videotex protocol,
means for decoding said bytes into alphanumeric and mosaic characters that are based on said videotex protocol and are independent of said display device protocol, and
device dependent driver means for converting said characters into said bit images in accordance with said display device protocol.

40. The apparatus of claim 39 wherein
said display device is arranged to display said bit images in accordance with visual attributes that are encoded in said stream of bytes in accordance with said videotex protocol, said visual attributes being conveyed to said display device in accordance with said display device protocol,
said means for decoding is arranged to decode said stream of bytes into visual attributes that are based on said videotex protocol and are independent of said display device protocol, and
said device dependent driver means is arranged to convert said visual attributes into visual features of said bit images in accordance with said display device protocol.

41. The apparatus of claim 39 comprising
a plurality of said display devices having different display device protocols, and
a plurality of said device dependent driver means, one for each said display device, for converting said characters into said bit images in accordance respectively with said different display device protocols.

42. Apparatus for decoding a frame of information represented by a stream of bytes received from a videotex supplier, said bytes being encoded in accordance with a videotex protocol, said apparatus comprising
means for decoding said bytes into alphanumeric and mosaic characters based on said videotex protocol, and
means for controlling said decoding by accepting said stream of bytes from said supplier and delivering each said byte to said decoding means,
said controlling means being arranged to accept and deliver said bytes to said decoding means without regard to the protocol-dependent information content of said bytes.

* * * * *

(12) REEXAMINATION CERTIFICATE (4422nd)
United States Patent
Sturgis et al.

(10) Number: US 4,751,669 C1
(45) Certificate Issued: Aug. 28, 2001

(54) VIDEOTEX FRAME PROCESSING

(75) Inventors: Samuel P. Sturgis, Medway; William T. Haggerty, Groton; Barbara C. Sangster, Wellesley Hills, all of MA (US)

(73) Assignee: Wang Laboratories, Inc., Lowell, MA (US)

Reexamination Request:
No. 90/005,081, Aug. 17, 1998

Reexamination Certificate for:
Patent No.: 4,751,669
Issued: Jun. 14, 1988
Appl. No.: 06/719,777
Filed: Apr. 4, 1985

Related U.S. Application Data

(63) Continuation-in-part of application No. 06/595,211, filed on Mar. 30, 1984.

(51) Int. Cl.$^7$ .................................. G09G 5/00
(52) U.S. Cl. ............................................ 345/115
(58) Field of Search ........................... 375/219, 200; 340/825.29; 345/1, 115

(56) References Cited

U.S. PATENT DOCUMENTS

| | | | |
|---|---|---|---|
| 4,205,343 | 5/1980 | Barrett | 380/18 |
| 4,260,855 | 4/1981 | Rubinstein | 179/7.1 R |
| 4,264,956 | 4/1981 | Delaney | 364/467 |
| 4,289,930 | * 9/1981 | Connolly et al. | . |
| 4,321,597 | 3/1982 | Martin | 340/824 |
| 4,323,921 | 4/1982 | Guillou | 358/114 |
| 4,338,599 | 7/1982 | Leininger | 340/721 |
| 4,434,472 | 2/1984 | Kachun | 364/900 |
| 4,439,761 | 3/1984 | Fleming et al. | 340/735 |
| 4,468,755 | 8/1984 | Iida | 364/900 |
| 4,484,306 | 11/1984 | Kulczyckyj et al. | 364/900 |
| 4,496,943 | 1/1985 | Greenblatt | 340/711 |
| 4,517,598 | 5/1985 | Van Valkenburg et al. | 358/142 |
| 4,527,250 | 7/1985 | Galdun et al. | 364/900 |
| 4,577,288 | 3/1986 | Busch | 364/900 |
| 4,611,298 | * 9/1986 | Schuldt | 364/900 |
| 4,688,031 | 8/1987 | Haggerty | 340/793 |
| 4,703,318 | * 10/1987 | Haggerty | 346/723 |
| 4,716,543 | * 12/1987 | Ogawa et al. | 364/900 |
| 4,754,326 | 6/1988 | Kram et al. | 364/900 |
| 4,965,557 | 10/1990 | Schepers et al. | 340/711 |

FOREIGN PATENT DOCUMENTS

| | | | |
|---|---|---|---|
| 61 018 | 4/1968 | (DE) | H04I/17/00 |
| 2 909 873 | 9/1979 | (DE) | H04I/17/00 |
| 32 28 354 A1 | 2/1984 | (DE) | H04N/5/44 |
| 32 44 212 A1 | 5/1984 | (DE) | H04N/1/26 |
| 0 158 767 | * 10/1985 | (EP) | H04M/11/08 |
| 59-33550 | 3/1984 | (JP) | G06F/3/04 |

OTHER PUBLICATIONS

"MUPID Handbuch", Dec. 1982.*

(List continued on next page.)

*Primary Examiner*—Amare Mengistu

(57) ABSTRACT

A videotex decoder apparatus which, in various aspects, displays a status line to indicate when connect charges are occurring; overlays menus over displayed videotex frames with portions of the displayed frames remaining visible; provides easily called log-on procedures; retrieves remote information frames by user-specified keywords names; prints information frames in selectable different overall sizes; provides selectable different character sets for display; is table-driven; is structured to include a device independent decoder and device dependent drivers; includes a controller which feeds bytes to the decoder for decoding without regard to the protocol-dependent information content of those bytes; and uses an added frame header on stored frames to indicate the videotex protocol for decoding the frames.

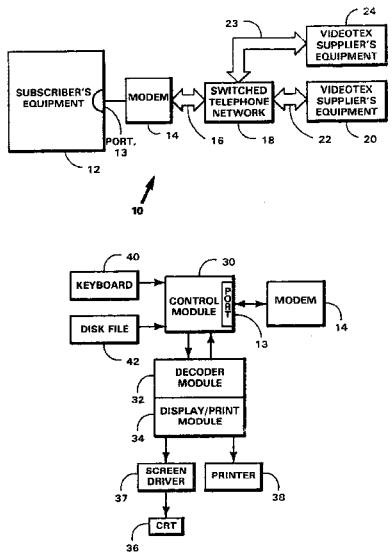

OTHER PUBLICATIONS

"SCEPTRE Owner's Manual", 1983.*
"Epson MX 80 Printer Manual", 1982.*
"Norpak" Product Information Package, Apr. 1981.*
"CROSSTALK XVI Smart Terminal & File Transfer Program" Users Manual, 1983.*
"A Fast File System for UNIX", Jul. 1983.*
IBM "Disk Operating System", 1981.*
Williams, Gregg, "The Apple Macintosh Computer: Mouse–window–desktop technology arrives for under $2500," BYTE Publications, Inc., Feb. 1984, pp. 30–40, 42–44, 46, 48 & 50–54, (AWP003087—AWP003107).
Hertzfield, Andy, "Macintosh System Software Overview," Macintosh ROM Overview. Nov. 12, 1983, pp. 1–4, (AWP003305—AWP003308).
Atkinson, Bill, "The MacPaint Document Format," 3 Pages, (AWP003309—AWP003311).
Horn, Bruce, "The Makings of a Modifiable Macintosh Resource Files Revisited," Macintosh Software Resource Files Revisited, Jul. 1, 1982, pp. 1–15, (AWP003317—AWP003331).
Hertzfield, Macintosh Product Introduction Plan, REV 1–1, Aug. 15, 1982, 4 Pages, (AWP003332—AWP003335).
Finder Interface Changes for MacPaint, Nov. 23, 1983, 5 Pages, (AWP003341—AWP003345).
Reekes, J. and Atkinson, B., "Technotes: MacPaint Document Format," 1983, pp. 1–5, from http://devworld.apple.com/ngs/lpp/...b/docs/dev/technotes/pt/pt_24.html, (AWP003312—AWP003316).
Macintosh MACPAINT Reference Manual, Copyright 1983, Apple Computer, Inc, 35 Pages, (AWP003270—AWP003304).
Amabile, C. and Ewing, R., VisiTrend/Plot User's Guide for the Apple II & II Plus 48K DOS 3.3, Copyright 1982, VisiCorp, 288 Pages, (AWP002799—AWP003086).
Lisa 2 Owner's Guide, Copyright 1983, Apple Computer, Inc, 319 Pages, (AWP003362—AWP003585 & AWP003612—AWP003706).
Update: Lisa 2 Owner's Guide Release 2.0, pp. 1–19, (AWP003346—AWP003361).
Profile Owner's Manual, Copyright 1983, Apple Computer, Inc, 26 Pages, (AWP003586—AWP003611).
LisaTerminal, User Guide, Copyright 1983, Apple Computer, Inc, 85 Pages, (AWP003707—AWP003791).
Lotus 123 User's Manual for the IBM Personal Computer and the XT: Release 1A, UK version, Copyright 1983, Lotus Development Corporation, 421 Pages, (AWP002367—AWP002787).
For your BTX Computer: MUPID Manual, Cover page and Postcard, 2 Pages, English translation of Document AF4 submitted in IDS filed Mar. 3, 1999. (W028697—W028697).
MUPID 320 A–I Technical Specification: Jan. 1984, pp. 1–40, Translation of Document AH5 submitted in IDS filed Mar. 3, 1999.
Greiner, G. and Maurer, H.A., MUPID—Documentation of a Presentation and MUPID Integer Basic Reference Card, Jun. 1982, Translation of Document AE2 submitted in IDS filed Mar. 3, 1999, 33 pages (including AWP001636—AWP001665).
The VisiSeries From VisiCorp, Copyright 1983, VisiCorp, 11 Pages, (AWP002788—AWP002798).
MYARC WDS/100 User Manual, MYARC, 1982, pp. 15–56, (AWP000730—AWP000773).
Rothamel, H. et al., "Interactive videotex terminals for office communications," NTZ, vol. 34, No. 12, 1981, pp. 1–20, (AWP000821—AWP000840).
Viewtron Magazine & Guide, Nov. 1983, pp. 1–24, (AWP000841—AWP000864).
Telephone Coupler (Modem): Model No. PHP1600, Texas Instruments, 1979, 19 pages, (AWP001131—AWP001149).
Video Modulator: Model UM1381 Operating Guide, and diagrams of Switch Box, Command Module, and Disk Manager 2, Texas Instruments, 1980–1982, 17 pages, (AWP001150—AWP001166).
MUPID Der erste Bildschirmtext–Kleincomputer, 9 Pages, (AWP001588—AWP001596). (See Doc. Ref. AG4 for translation).
Greiner, G. et al., "Der MUPID—Dokumentation einer Prasentation," Jun. 1982, 24 pages, (AWP001636—AWP001661).
American National Standard: addditional controls for use with American national standard code for information exchange, American National Standards Institute, 1979, Chapters 1–12, Appendices A–H, (AWP001662—AWP001744).
The Viewtron Newsletter, vol. 1, No. 1, Dec. 1981, 4 pages, (AWP001954—AWP001957).
The Viewtron Newsletter vol. 2, No. 1, Jun. 28, 1982, 8 pages, (AWP001958—AWP001965).
The Viewtron Newsletter, vol. 3, No. 1, Mar. 1, 1983, 6 pages, (AWP001966—AWP001971).
The Viewtron Newsletter, vol. 3, No. 2, Jun. 27, 1983, 6 pages, (AWP001972—AWP001977).
The Viewtron Newsletter, vol. 1, No. 3, Jan. 1984, 4 pages, (AWP001978—AWP001981).
The Viewtron Newsletter, vol. 1, No. 4, Feb. 1984, 4 pages, (AWP001982—AWP001985).
The Wolfdata Color Editing System, 9 Pages, (AWP002214—AWP002222).
Bildschirmtextahnliche Systeme, Univeristy of Graz, Feb. 1983, pp. 1–9, 84–87. (AWP002230—AWP002238).
"MCG MUPID 320 DF Bedienungsanleitung," pp. 1–11, (AWP002239—AWP002247).
Guenther, S. et al., "Storage and reading of Cassette Files," Data Processing Institute, 5 pages, (AWP002248—AWP002252). (Translation of Doc. Ref. AH3).
Translation of Doc. Ref. AI3 ("MCG MUPID 320 DF Bedienungsanleitung"), 12 pages, (AWP002277—AWP002288).
Fur Ihren BTX Computer: MUPID Handbook, Cover page, (W 028697—W 028697).
MUPID: The first Videotex Micro Computer, MUPID International, 8 pages, (W 029700—W 029707). (Translation of Doc. Ref. AJ1).
The Wang Professional Computer: Introductory Guide, Wang Laboratories, Inc., Nov. 1983, 276 pages, (W 024547—W 024823).
The Wang Professional Computer: Utility Programs User Guide, Wang Laboratories, Inc., Nov. 1983, 215 pages, (W 024824—W 025039).
The Wang Professional Computer: Utilities Reference Card, 4 Pages, (W 025040—W 025041).
Videotex/Teletext Presentation Level Protocol Syntax: North American PLPS, American National Standards Institute and Canadian Standards Association, Dec. 1983, p. 1–158.

*Prestel Information Provider Manual,* Prestel IP Services, Sep. 1976–Feb. 1983, Chapters 1–8, (W 029125—W 029260).

Aranda, Rembert, *Personal Office Computing: Information Networks and Videotex as Pathways to Office Automation for Professionals and Managers,* Savant Research Studies for Savant Institute, 1982, pp. 91–135, (W 029424—W 029472).

"MUPID 320 A–I Technische Spezifikation," Mupid Computer GmbH, Jan. 1984, pp. 1–38, (AWP001597—AWP001630T).

Hudson, Graham, "Prestel: The Basis of an Evolving Videotex System," BYTE, Jul. 1983, nineteen pages, beginning at p. 61.

*Videotex '83 Conference Proceedings,* London Online, Inc., 1983, pp. 61–84, 157–162, 171–178, 217–222, 231–248 and 337–344, (NET001291—NET001363).

*Videotex '84 Conference Proceedings,* 1984, Cover page, pp. 1–14, 27–32, 37–54, 125–142, 151–158, 173–184, 215–224, 233–256 and 375–386, (NET003850 and NET001364—NET001496).*

"Wang Professional Computer Viewdata Decoder," Copyright 1983, Wang Laboratories, Inc., four pages, (W 015272—W 015275).*

Hirsch, Phil, "American Bell Unveils Videotex Terminal But Software Could Make It Obsolete," *Computerworld,* Jul. 4, 1983, pp. 54–55.*

*Prestel Terminal Specification Edition One Plus updates,* 1980–1982, the Post Office, 72 pages, (W 000057—W 000128).*

Hindin, Harvey J., "Special Report: Videotex looks brigher as developments mount," *Electronics,* Aug. 25, 1982, pp. 89–100, (W 000412—W 000424).*

*American National Standard: code for information exchange,* American National Standards Institute, 1977, 21 pages, (AWP 001167—AWP 001187).*

*Draft Standard: Videotex/Teletext Presentation Level Protocol Syntax (North American PLPS),* Aug. 1, 1982, pp. i–iii and 1–142, (W 001640—W 001785).

*Preliminary Standard T500–1982 Videotex/Teletext Presentation Level Protocol Syntax (North American PLPS),* Canadian Standards Association, 1982, pp. I–xi and 1–94, (W 001786—W 001903).

*Presentation Level Protocol: Videotex Standard,* Bell System, May 1981, pp. I–iii, 1–42, 95–109, 111–114, 116, 118, 120, 122, 124, 126, and 43–105, (W 001931—W 001979, W 001904—W 001928, W 001980—W 002042).

Bown, H.G. et al., *A General Description of Telidon: A Canadian Proposal for Videotex Systems,* Communications Research Centre, Dec. 1978, pp. iii and 1–26, (W 002043—W 002072).

ANSI American National Standards Committee Correspondence Memo, Oct. 1, 1982, eleven pages, (W 002106—W 002117).

ANSI American National Standards Committee Correspondence Memo, Sep. 2, 1982, one page, (W 002130).

ANSI American National Standards Committee Correspondence Memo, Mar. 4, 1982, twelve pages, (W 002118—W 002129).

Comments accompanying M.W. Bishop's negative vote on the current draft of Videotex/Teletext Standard (X3L2/82–96), 1982, ten pages, (W 002131—W 002140).

ANSI American National Standards Committee Correspondence Memo, May 14, 1982, three pages, (W 002141—W 002143).

ANSI American National Standards Committee Correspondence Memo, Jun. 16, 1982, two pages, (W 002144—W 002145).

Hughes, David, "Negative Comments on Videotex Letter Ballot (X3L2/82–95)," Aug. 28, 1982, fourteen pages, (W 002146—W 002159).

Handwritten notes regarding Videotex/teletext Presentation Level Protocol Syntax (NA–PLPS) Draft Standards, Aug. 26, 1982, three pages, (W 002160—W 002162).

NAPLPS Ballot Comments by J.D. Wetherington and R.J. Pellar, 1982, four pages, (W 002163—W 002166).

ANSI American National Standards Committee Correspondence Memo, Aug. 17, 1982, eight pages, (W 002167—W 002174).

Comments on NAPLPS by Paul Korman, 1982, three pages, (W 002175—W 002177).

Miscellaneous memos and notes from X3H3 Graphics Committee individuals, 1982, thirteen pages, (W 002178—W 002190).

Straayer, David H., "Hoisting the Color Standard," *Computer Design,* Jul. 1982, five pages, (W 002191—W 002195).

ANSI American National Standards Committee Correspondence Memo, Aug. 25, 1982, six pages, (W 002196—W 002201).

Communication from Lloyd Hollis to ANSI/X3I2 US CCITT SG B regarding Videotex, Aug. 26, 1982, seven pages, (W 002202—W 002208).

*Draft Proposed American National Standard for Videotex/Teletext Presentation Level Protocol Syntax (North American PLPS),* 1982–1983, Foreword, pp. 1–6, Standard pp. I–iii, and I–152, (W 002209—W 002289).

Sebestyen, Istvan and Nimetz, Matthew, "A Democratic Use of New Technology," *In Depth,* Oct. 17, 1983, pp. 15–38, (W 004451—W 004465).

*Prestel: The Technology,* brochure, pp. 1–23, (W 004343—W 004366).

Fleming, Jim, "NAPLPS: A New Standard for Text and Graphics—Part 4: More Advanced Features and Conclusions," *BYTE,* May 1983, pp. 272–274, 276, 278, 282 and 284, (W 005316—W 005322).

Fleming, Jim, "NAPLPS: A New Standard for Text and Graphics—Part 3: Advanced Features," *BYTE,* Apr. 1983, pp. 190, 192, 194, 196, 198, 202, 204 and 206, (W 005323—W 005330).

Fleming, Jim, "NAPLPS: A New Standard for Text and Graphics—Part 2: Basic Features," *BYTE,* Mar. 1983, pp. 152, 154, 156, 159, 161–164, 166, 170, 172, 174, 176, 180, 184 and 186, (W 004488—W 004504).

Fleming, Jim, "NAPLPS: A New Standard for Text and Graphics—Part 1: Introduction, History, and Structure," *BYTE,* Feb. 1983, twenty–three pages between pp. 203–254, (W 005348—W 005370).

*The C Programming Language,* Chapter 0, Chapter 1, and Appendix A, pp. 1–31 & 179–219, (W 005383—W 005454).

*Motronic: MUPID 320 AF Operating Instructions,* 15 pages, (AWP 003886—AWP 003902). (Translation of Doc. Ref. AI11).

*Motronic: 320 AF Bedienungsanleitung,* 15 pages, (AWP 003876—AWP 003885).

Thacker, C.P. et al., *Alto: A personal computer*, Copyright 1979, Xerox Corporation, pp. 1–14, (NSCP011065—NSCP011079).
*Alto User's Handbook*, XEROX: Palo Alto Research Center, Sep. 1979, 159 pages, (NSCP007041—NSCP007199).
Smith, David C. et al., "The star user interface: an overview," *AFIPS Conference Proceedings*, vol. 51, 1982 National Computer Conference, pp. 517–528 (NSCP007273—NSCP007288).
*External Specification Change Notice: OS 4.0 Star Workstation*, XEROX Office Systems Division, Oct. 15, 1982, 166 pages, (NSCP012188—NSCP012353).
*XEROX 8010 Information System Reference Guide*, Copyright 1983, XEROX Corporation, 435 pages, (NSCP 012354—NSCP 012789).
Graf, Peter H., "Das Videotex–System Antiope," *NTZ*, vol. 33, No. 8, (1980), pp. 538–543, (W 000397—W 000402).
Harashima, Susumu et al., "Japanese VIDEOTEX System "CAPTAIN"—Experimental Service and User Reactions Outline", *IEEE Transactions on Communications*, vol. COM–29, No. 12, Dec. 1981, pp. 1959–1967, (W 000403—W 000411).
*Bildschirmtext–Station T 3110*, Siemens Aktiengesellschaft, Mar. 1984, four pages, (W 000439—W 000442).
Rothamel et al., "Bildschirmtextendgerate fur die Kommunkation im Buro," *NTZ*, vol. 34, No. 12, (1981), pp. 862–866, (W 000443—W 000447); and partial translation from Telekommunication, (AWP000418).
Gabel, J., "Medienschau mit Zukunftsvision," *NTZ*,, vol. 32, No. 1, (1979), pp. 744–750, (W000448—W000454).
Fellbaum, "Uberblick uber Verfahren der elektronischen Textkommunikation," *NTZ*, vol. 32, No. 1, (1979), pp. 662–666, (W 000455—W 000459).
*The Viewtron Handbook*, Copyright 1983, Viewdata Corporation of America, Inc, 45 pages, (AWP 000774—AWP 000818).
Evangelisti, C.J. and Kannan, K., "Enhanced Functions for Videotex Terminals," *IBM Technical Disclosure Bulletin*, vol. 24, No. 9, Feb. 1982, pp. 4517–4521, (AWP 000001—AWP 000006).
*Solid State Software Terminal Emulator II Command Module Reference Manual*, Copyright 1981 Texas Instruments, Inc, 48 pages, (AWP 000007—AWP 000054).
*Read this first!*, Texas Instruments TI–99/4A Computer Reference Manual, Copyright 1979 Texas Instruments Incorporated, 219 pages, (AWP 000055—AWP 000273).
*Texas Instruments Home Computer Peripheral Expansion System Model No. PHP1200 Reference Manual*, 12 pages, (AWP 000274—AWP 000285).
*Texas Instruments Home Computer Memory Expansion Card Model No. PHP1260 Reference Manual*, 11 pages, (AWP 000300—AWP 000310).
*Texas Instruments Home Computer Disk Memory Drive Model No. PHP1250 Reference Manual*, 19 pages, (AWP 000311—AWP 000329).
*Texas Instruments Home Computer Disk Memory System Model No. PHP1240 Reference Manual*, 52 pages, (AWP 000330—AWP 000381).
*Texas Instruments Home Computer RS232 Interface Card Model No. PHP1220 Reference Manual*, 35 pages, (AWP 001026—AWP 001060).
English translation of Doc. Ref. AD4 (JP 59–33550), 1984, two pages, (AWP 000453—AWP 000454).

Isozaki, Kiyoshi and Watanabe, Toshiaki, "Advanced CAPTAIN System," *Japan Telecommunications Review*, Jan. 1982, pp. 43–51, (AWP 000510—AWP 000518).
Fellner, W.D., *MUPID—The Editor*, Institute Fur Informationsverarbeitung, Apr. 1983, pp. 1–55, (AWP 000865—AWP 000898). (Translation of Doc. Ref. AJ16).
Jaburek, W. et al., *MUPID—BASIC: The Language*, Institute fur Informationsverarbeitung, Apr. 1983, 45 pages, (AWP 000903—AWP 0000947). (Translation of Doc. Ref. AI16).
*Texas Instruments Terminal Emulator Protocol Manual*, May 18, 1981, 55 pages, (AWP 000948—AWP 001002).
*American National Standard Procedures for the Use of the Communication Control Characters of American National Standard Code for Information Interchange in Specified Data Communication Links*, Approved Dec. 17, 1975, American National Standards Institute, Inc, 66 pages, (AWP 001188—AWP 001253).
"MUPID in operation", 1 page, (AWP 001338T).
"MUPID Status indicators", 1 page, (AWP 001630T). (Translation of p. 33 of Doc. Ref. AH5).
*VT100 User Guide*, Copyright 1978,1979,1981, Digital Equipment Corporation, pp. 1–90, (AWP 001745—AWP 001753 & AWP 001756—AWP 001839).
Jaburek, W. et al., *MUPID—Basic: Die Sprache*, Institute fur Informationsverarbeitung, May 1982, pp. 1–103, (AWP 001840—AWP 001894).
Fellner, W.D., *MUPID—Der Editierer*, Institute fur Informationsverarbeitung, Oct. 1982, pp. 1–112, (AWP 001895—AWP 001953).
*Viewtron Magazine & Guide*, Mar. 1984, 58 pages, (AWP 001988—AWP 002045).
*Viewtron Magazine & Guide*, Dec. 1983, pp. 1–49, (W 030176—W 030224).
*Videotex Provisional Standard; Session Level Terminal Protocol*, Bell System, Nov. 1981, (AWP002169—AWP2213).
Telidon brochure, Information Services, Department of Communications, Government of Canada, May 1981, 20 pages, (AWP002253—AWP 002276).
Bochmann, G.V. et al., "Keyword access in Telidon: an experiment," *Online*, 1982, pp. 345–356, (NSCP012790—NSCP012802).
*VIS: Videotex and Office Information System*, Radio Shack, 1984, (NSCP004524—NSCP004531).
*TRS–80 Model II: Profile II*, Radio Shack, 2 pages (NSCP005296—NSCP005297).
Joslin, P.H., *PC/Videotex Product Functional Specifications*, Feb. 15, 1984, pp. 1–29, Feb. 15, 1984, (NSCP012156—NSCP012184); and "Programming Announcement," IBM Inforamtion Systems Group, Nov. 6, 1984, pp. 1–3, (NSCP012185—NSCP012187).
*MUPID: The first Videotex Micro Computer: A new medium with universal possibilities*, MUPID International, (W 029708—W 029718).
Haimes, Alan R., "The Shape of Videotex Systems Today and Tomorrow," *Midcon/83 Conference Record*, Sep., 1983, pp. 1–4, (NET003821—NET003825).
Firth, R.J., *Managing Viewdata Systems*, pp. 52–57, (NET003826—NET003829).
Woolfe, R. et al., "LECTURE: Videotex Development outside the Community," *Proceedings of the Videotex in Europe Conference*, Jul. 19–20, 1979, pp. 44–50, (NET003830—NET003837).

"TEXT: Character Sets for Communication of Text," *Proceedings of the Videotex in Europe Conference,* Jul. 19, 1979, pp. 111–117, (NET003838—NET003845).

*Viewdata in Action: A Comparative Study of Prestel,* McGraw–Hill Book Company (UK) Limited, 1981, Entire book.

*Micro PLATO Authoring System Reference Guide,* version 1.0, 1985, 160 pages, (NSCP006333—NSCP006492).

*A User Guide to the UNIX System,* Osborne/Mc–Graw Hill, 1982, pp. 206–213, (NSCP0013469—NSCP013477).

Feiertag, R.J. and Organick, E.I., "The Multics Input/Output System," pp. 35–41, (NSCP014062—NSCP014068).

*Telidon: This is Telidon,* The Telidon Marketing Secretariat of the Department of External Affairs, Ottawa, Ontario, (NSCP004591—NSCP004647).

*Sourceworld,* Nov./Dec. 1981, vol. 2, No. 3, pp. 1–48, (NSCP004821—NSCP004872).

*Source Digest; A Directory of Services on the Source,* Source telecomputing Corporation, Nov. 1981, (NSCP004900—NSCP004935).

*Viewdata 80: First World Conference on Viewdata, Videotex & Teletext,* Online Conferences Ltd., Mar. 26, 1980, pp. 1–466, (NSCP005680—NSCP006166).

*PLATO: Microlink Text Processing,* Control Data Corporation, 1983, pp. 1–10, (NSCP006492—NSCP006502).

Stifle, J.E., *The PLATO V Terminal Manual,* University of Illinois, Aug. 1977, pp. 1–58, (NSCP006221—NSCP006284).

*PLATO terminal resident specification,* Control Data Corporation, Feb. 6, 1984, pp. 1–95, (NSCP006679—NSC0006786).

*PLATO: Electronic Mail,* Control Data Corporation, 1983, pp. 1–16 (NSCP006502—NSCP006513).

*PLATO: Microlink Graphics Design,* Control Data Corporation, 1983, pp. 1–10, (NSCP006514—NSCP006522).

*PLATO: Microlink Road Map,* Control Data Corporation, 1983, pp. 1–12, (NSCP006532—NSCP006541).

*Accessing PLATO Microlink Services,* Control Data Corporation, 1983, pp. 1–11, (NSCP006542—NSCP006551).

Paulson, Roger F., *Control Data PLATO System Overview: A Multimedia Computer–Based Educational Delivery System,* Copyright 1976, Control Data Corporation, (NSCP006552—NSCP006627).

*Draft Standard: Videotex/Teletext Presentation Level Protocol Syntax (North American PLPS),* with edits, Aug. 1, 1982, pp. i–iii and 1–142, (W 001310—W 001455).

Trigg, Randall H, *A Network–Based Approach to Text Handling for the Online Scientific Community,* Nov. 1983, pp. iv–vi, 58–71 and 127–134, (W 010515—W 010541).

Tydeman, John et al., *Teletext and Videotex in the United States,* McGraw–Hill, 1982, Entire book.

Wong, Peter C.S. and Reid, Eric R., "Flair—User Interface Dialog Design Tool," *Computer Graphics,* vol. 16, No. 3, Jul. 1982, pp. 87–98, (W 010564—W 010575).

Lantz, Keith, et al., Third Generation Graphics for Distributed Systems, *Stanford University Report No. STAN–CS–82–958,* Feb. 1983, pp. 1–36, (W 010577—W 010610).

Fuchs, David R. and Knuth, Donald F., "Optimal Font Caching," *Stanford University Report No. STAN–CS–82–901,* Mar. 1982, pp. 1–19 (W 010612—W 010631).

Feeley, J. and Tenne–Sens, A., "Interactive Telidon in Canada," *Viewdata '81,* Oct. 1981, pp. i and 39–49, (W 010633—W 010644).

Harashima, S. and Kobayashi, M., "Enhanced functions and hybrid transmission in CAPTAIN," *Viewdata '81,* Oct. 1981, pp. i and 79–93, (W 010646—W 010661).

Over, G.M., "Siemens international videotex system," *Viewdata '81,* Oct. 1981, pp. i 117–132, (W 010663—W 010679).

Brigish, A.P., "Electronic Yellow Pages," *Viewdata '81,* Oct. 1981, pp. i and 187–191, (W 010681—W 010686).

Remington–Hobbs, N., "TOPIC—a major private viewdata system," *Viewdata '81,* Oct. 1981, pp. i and 263–272, (W 010688—W 010698).

Clark, R.A., "Viewdataprocessing: interactive viewdata at last," *Viewdata '81,* Oct. 1981, pp. i and 481–493, (W 010705—W 010718).

Inoue, R., "The Index System of the CAPTAIN System Experimental Service," *Viewdata and Videotext. 1980–1981: A Worldwide Report: Transcript of viewdata '80, first world conference on viewdata, videotex, and teletext,* Cover pages and pp. 113–122 (NET003848—NET003849 and W 010720—W 010730).

Bochmann, Gregor V. and Gecsei, Jan, "Towards Videotex Standards," *Viewdata and Videotext, 1980–1981: A Worldwide Report: Transcript of viewdata '80, first world conference on viewdata, videotex, and teletext,* Cover pages and pp. 253–262, (NET003848—NET003849 and W 010732—W 010742).

Ball, A.J.S. and Gecsei, J., *User Interfaces for Future Videotex Systems,* Publication #412, University of Montreal, May 1981, pp. 1–64, (W 010745—W 010811).

Gecsei, Jan, "Towards Distributed Processing in Videotex," Montreal Univ., Publication 447, Apr. 1982, pp. 1–20, (W 010813—W 010832).

Tompa, Frank Wm. et al., "The Application of Current Database Technology to Videotex," Montreal Univ., Publication 414, Jun. 1981, pp. 1–49, (W 010834—W 010891).

Bochmann, Gregor V., "Overview of Protocols in Distributed Videotex Systems," Montreal Univ., Publication 413, May 1981, pp. 1–46, (W 010893—W 010939).

Tompa, Frank Wm. et al., "Data Structuring Facilities for Interactive Videotex Systems," Montreal Univ., Publication 391, Nov. 1980, pp. 1–20, (W 010941—W 010962).

Hedger, J. and Eason, R., "Telesoftware: adding intelligence to teletext," *Proc. IEE,* vol. 126, No. 12, Dec. 1979, pp. 1412–1416, (W 010964—W 010968).

Robertson, G. et al., "ZOG: A Man–Machine Communication Philosophy," Carnegie Mellon University, Aug. 4, 1977, pp. i–ii and 1–53, (W 010970—W 011025).

"Computers bring new services to home subscribers," *Computer,* 1978, pp. 102–103, (W011027—W011028).

Martin, James, "Viewdata: The Information Society," *Computerworld Extra!,* 1982, 5 pages, (W 011030—W 011034).

"Videotex Goes to Work," 1 page, (W 011035).

Ball, A.J.S. et al., "Videotex Networks," *Computer,* Dec. 1980, pp. 8–14, (W011037—W011043).

*The Wang Professional Computer Videotex Decoder User Guide,* Wang Laboratories, 1$^{st}$ Edition—Apr. 1984, 52 pages, (W 002570—W 002621).

O'Brien, C.D. et al., *Telidon Videotex Presentation Level Protocol: Augmented Picture Description Instructions,* Communications Research Centre, CRC Technical Note No. 709–E Feb. 1982, 181 pages, (W 032524—W 032705).

*Videotex Standard Presentation Level Protocol,* Bell System, May 1981, pp. I–iii and 1–105, (DO 000006—DO 000117).

Bown, H.G. et al., *Picture Description Instructions PDI for the Telidon Videotex System,* Communications Research Centre, CRC Technical Note No. 699–E, Nov. 1979, pp. iii and 1–71, (DO 000273—DO 000346).

*User's Reference Guide: A complete detailed guide to using and enjoying your Texas Instruments computer,* 1979, 1989, 1981, Texas Instruments, Inc., 211 pages, (AWP000063—AWP000273).

*The Viewtron Newsletter,* vol. 1, No. 6, Apr. 1984, four pages, (AWP002046—AWP002049).

*The Viewtron Newsletter,* vol. 1, No. 7, May 1984, four pages, (AWP002050—AWP002053).

*Viewtron Magazine & Guide,* Jun. 1984, 52 pages, (AWP002054—AWP002105).

*Radio Shack Product Catalog,* 1982, pp. 1–56 (NSCP005298—NSCP005353).

*Tandy . . . Clearly Superior,* 1985 Catalog, 75 pages, (NSCP005354—NSCP005427).

*TRS–80 Computer Catalog No. RSC–5,* Radio Shack, 1981, pp. 1–36, (NSCP004532—NSCP004568).

*Wang Professional Computer Series: Prestel Decoder User's Guide,* 1984–1985, 91 pages, (W 012048—W 012138).

*The Wang Professional Computer Teletel Decoder User's Guide,* 1$^{st}$ Edition, Wang Laboratories, Dec. 1984, 40 pages, (W 011950—W 011989).

*MUPID Handbook,* Introductory pages and Table of Contents, Dec. 1982, pp. 1–17, (AWP 002289—AWP 002305).

Photographs by the University of Graz and/or Mupid Computer GmbH, 1983, 7 pages, (AWP002223—AWP002229).

Wang Laboratories, Inc. v. America On–Line, Inc. and Netscape Communications Corp., United States Court of Appeals for the Federal Circuit, Docket No. 98–1363.

Wang Laboratories, Inc. v. America On–Line, Inc. and Netscape Communications Corp., United States District Court for the Eastern District of Virginia, Docket No. 97–CV–1628.

\* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–7, 12–16, 18, 20–22 and 31–42 is confirmed.

Claims 1, 8–11, 17, 19 and 23–30 are cancelled.

\* \* \* \* \*